(12) United States Patent  (10) Patent No.: US 8,351,118 B2
Tokita et al.  (45) Date of Patent: Jan. 8, 2013

(54) POLARIZATION SPLITTING DEVICE, METHOD OF MANUFACTURING POLARIZATION BEAM SPLITTER, OPTICAL SCANNING DEVICE, AND IMAGE FORMING APPARATUS

(75) Inventors: Toshiaki Tokita, Kanagawa (JP); Hideaki Hirai, Kanagawa (JP); Seizo Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 502 days.

(21) Appl. No.: 12/603,731

(22) Filed: Oct. 22, 2009

(65) Prior Publication Data

US 2010/0118366 A1  May 13, 2010

(30) Foreign Application Priority Data

Nov. 7, 2008 (JP) ................................. 2008-286644
Jun. 17, 2009 (JP) ................................. 2009-143828

(51) Int. Cl.
*G02B 5/30* (2006.01)
(52) U.S. Cl. ............................... 359/485.05; 359/485.01
(58) Field of Classification Search ............. 359/485.01, 359/485.05, 566, 569, 618, 629, 485.03
See application file for complete search history.

(56) References Cited

U.S. PATENT DOCUMENTS

| | | | |
|---|---|---|---|
| 5,155,622 A * | 10/1992 | Kawatsuki et al. ...... | 359/485.03 |
| 5,546,216 A | 8/1996 | Suzuki et al. | |
| 5,606,181 A | 2/1997 | Sakuma et al. | |
| 5,875,051 A | 2/1999 | Suzuki et al. | |
| 6,069,724 A | 5/2000 | Hayashi et al. | |
| 6,081,386 A | 6/2000 | Hayashi et al. | |
| 6,104,522 A | 8/2000 | Hayashi et al. | |
| 6,233,081 B1 | 5/2001 | Suzuki et al. | |
| 6,256,133 B1 | 7/2001 | Suzuki et al. | |
| 6,330,017 B1 | 12/2001 | Suzuki et al. | |
| 6,347,004 B1 | 2/2002 | Suzuki et al. | |
| 6,384,949 B1 | 5/2002 | Suzuki | |
| 6,388,792 B1 | 5/2002 | Atsuumi et al. | |
| 6,400,391 B1 | 6/2002 | Suhara et al. | |
| 6,417,509 B1 | 7/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 6,657,761 B2 | 12/2003 | Suzuki et al. | |
| 6,771,407 B2 | 8/2004 | Hayashi et al. | |
| 6,781,729 B2 | 8/2004 | Suzuki et al. | |
| 6,785,028 B1 | 8/2004 | Atsuumi et al. | |
| 6,788,444 B2 | 9/2004 | Suzuki et al. | |
| 6,791,729 B2 | 9/2004 | Atsuumi et al. | |
| 6,800,845 B2 | 10/2004 | Sakai et al. | |
| 6,813,051 B2 | 11/2004 | Suzuki et al. | |
| 6,829,104 B2 | 12/2004 | Suzuki et al. | |

(Continued)

FOREIGN PATENT DOCUMENTS

JP  S60-32019 A  2/1985
(Continued)

*Primary Examiner* — James Phan
(74) *Attorney, Agent, or Firm* — Dickstein Shapiro LLP

(57) ABSTRACT

A polarization splitting device includes a polarization beam splitter having a polarization splitting surface and allows P-polarized light to transmit therethrough and reflects S-polarized light. A subwavelength structure grating is formed on the polarization splitting surface with a grating pitch smaller than wavelength of incident light. The polarization splitting device also includes a polarizer that is arranged on an optical path of light reflected from the polarization beam splitter and has a transmission axis that is parallel to a polarization direction of the S-polarized light.

16 Claims, 17 Drawing Sheets

U.S. PATENT DOCUMENTS

| | | |
|---|---|---|
| 6,833,940 B2 | 12/2004 | Suzuki et al. |
| 6,906,739 B2 | 6/2005 | Suzuki et al. |
| 6,999,208 B2 | 2/2006 | Suzuki et al. |
| 7,006,120 B2 | 2/2006 | Sakai et al. |
| 7,038,822 B2 | 5/2006 | Sakai et al. |
| 7,045,773 B2 | 5/2006 | Suzuki et al. |
| 7,050,082 B2 | 5/2006 | Suzuki et al. |
| 7,061,658 B2 | 6/2006 | Suzuki et al. |
| 7,088,485 B2 | 8/2006 | Suzuki et al. |
| 7,167,288 B2 | 1/2007 | Miyatake et al. |
| 7,215,354 B1 | 5/2007 | Sakai et al. |
| 7,245,430 B2 | 7/2007 | Kobayashi et al. |
| 7,256,815 B2 | 8/2007 | Suzuki et al. |
| 7,277,212 B2 | 10/2007 | Miyatake et al. |
| 7,333,254 B2 | 2/2008 | Amada et al. |
| 7,403,316 B2 | 7/2008 | Amada |
| 7,450,274 B2 | 11/2008 | Itabashi et al. |
| 7,492,990 B2 | 2/2009 | Hashiguchi et al. |
| 7,532,227 B2 | 5/2009 | Nakajima et al. |
| 2003/0174344 A1* | 9/2003 | Jones et al. .................. 356/616 |
| 2005/0195485 A1 | 9/2005 | Hirai et al. |
| 2006/0114474 A1* | 6/2006 | Ishizuka et al. ............... 356/495 |
| 2007/0216316 A1 | 9/2007 | Hirano et al. |
| 2007/0217011 A1 | 9/2007 | Kiyosawa et al. |
| 2008/0019255 A1 | 1/2008 | Imai et al. |
| 2008/0106789 A1 | 5/2008 | Hirai et al. |
| 2008/0204841 A1 | 8/2008 | Suzuki et al. |
| 2008/0204852 A1 | 8/2008 | Amada et al. |
| 2008/0267663 A1 | 10/2008 | Ichii et al. |
| 2008/0284838 A1 | 11/2008 | Suzuki et al. |
| 2009/0074437 A1 | 3/2009 | Tanabe et al. |
| 2009/0080907 A1 | 3/2009 | Hagiya et al. |
| 2009/0175657 A1 | 7/2009 | Yoshii et al. |

FOREIGN PATENT DOCUMENTS

| | | |
|---|---|---|
| JP | H07-144434 A | 6/1995 |
| JP | 2007-279670 A | 10/2007 |
| JP | 2008-070599 A | 3/2008 |
| JP | 2008-116965 A | 5/2008 |

* cited by examiner

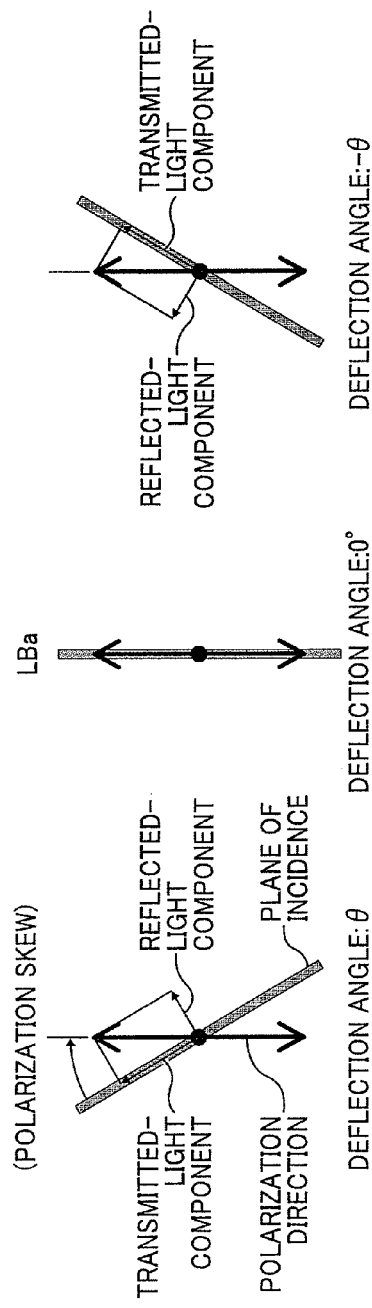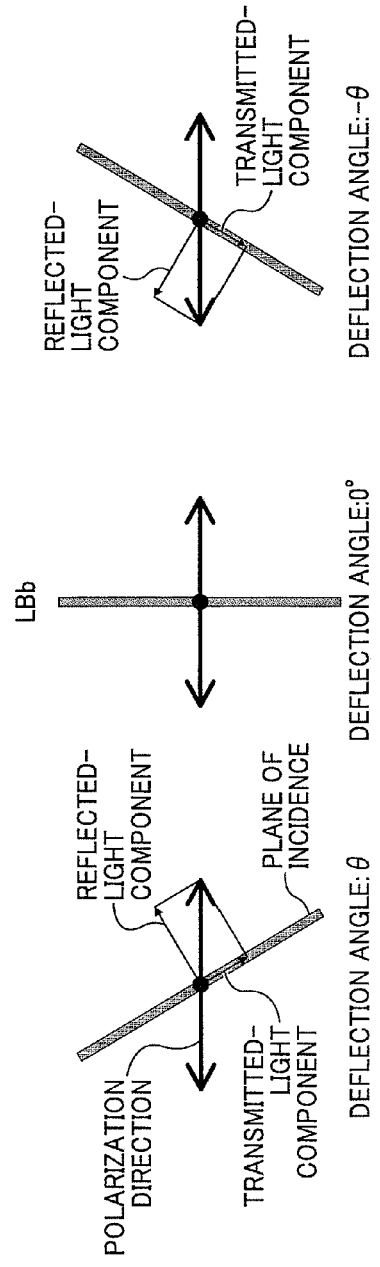

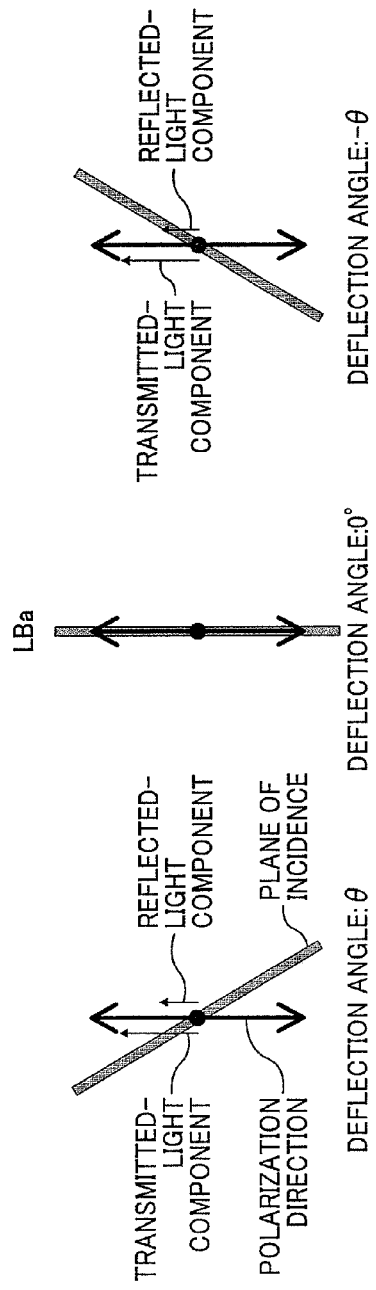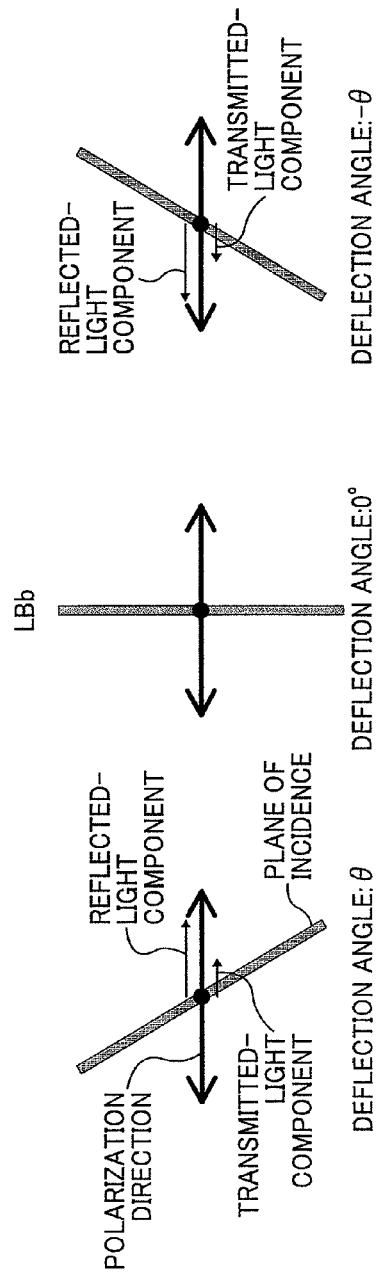

POLARIZATION SPLITTING DEVICE, METHOD OF MANUFACTURING POLARIZATION BEAM SPLITTER, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2008-286644 filed in Japan on Nov. 7, 2008 and Japanese Patent Application No. 2009-143828 filed in Japan on Jun. 17, 2009.

BACKGROUND OF THE INVENTION

1. Field of the Invention

The present invention relates to a polarization splitting device, a method of manufacturing a polarization beam splitter, an optical scanning device, and an image forming apparatus. More particularly, the invention relates to a polarization splitting device that splits lights that are polarized in different directions, a method of manufacturing a polarization beam splitter for use in the polarization splitting device, an optical scanning device including the polarization splitting device, and an image forming apparatus including the optical scanning device.

2. Description of the Related Art

Image forming apparatuses that record electrophotographic images by using laser beams have been widely used. Such an image forming apparatus typically includes an optical scanning device that scans a surface of a photosensitive drum with laser light in an axial direction of the drum by using a deflector (e.g., a polygon mirror) while rotating the drum to thereby form a latent image on the surface of the drum.

In recent years, tandem-type image forming apparatuses that include a plurality of (typically four) photosensitive drums have come into widespread. The tandem-type image forming apparatuses permit high-speed color image formation.

A tandem-type image forming apparatus is likely to be upsized with the increase in the number of the drums. How to make the units of the image forming apparatus, such as an optical scanning device, compact has been an issue. One approach is to superimpose a plurality of optical paths of scanning light beams traveling from a deflector to a corresponding one of photosensitive drums.

For example, Japanese Patent Application Laid-open No. 2008-70599 discloses a conventional optical scanning device. This optical scanning device includes a light source device that emits a plurality of light beams of different polarization directions, a single optical deflecting unit that performs deflection scanning in a main-scanning direction with the light beams emitted from the light source device, a scanning-image forming unit that causes each of the light beams to be converged on a corresponding one of a plurality of surfaces to be scanned, and an optical element that is an optical-path branching unit that is positioned in an optical path from the optical deflecting unit to a corresponding one of the scanned surfaces and that branches an optical path of each of the light beams depending on the polarization direction of the light beam. A projections-and-pits structure whose pitch is equivalent to the wavelength of the light beam or smaller is formed on the optical element.

Japanese Patent Application Laid-open No. 2008-116965 discloses another conventional optical scanning device. This optical scanning device includes a microstructure grating in which grating pitch decreases with increasing incident angle and grating arrangement direction is horizontally or perpendicularly oriented to polarization direction. The microstructure grating is arranged on the surface of an optical element so that Fresnel (surface) reflection from lens surface. This structure is advantageous in reducing a flare spot or ghost light.

Japanese Patent Application Laid-open No. S60-32019 discloses a conventional recording apparatus. This recording apparatus includes two laser light sources that emit two laser beams linearly polarized to be perpendicular to each other and have luminous intensities modulated based on signals to be recorded, a polarized-light combining unit that combines the two laser light beams emitted from the laser light sources together, a deflecting unit that deflects the combined laser light in a main-scanning direction, and a polarized-light splitting unit that splits the combined laser light deflected by the deflecting unit to light beams into different spots on a scanning-recording surface.

Japanese Patent Application Laid-open No. H7-144434 discloses another conventional optical scanning device. This optical scanning device includes a single laser light source that emits laser light, an information control unit that imparts different information pieces to two polarized light beams emitted from the light source, a polarization control unit that controls a degree of polarization based on data from the information control unit, a scanning unit that scans a predetermined illumination surface with the light beam polarized by the polarization control unit, a splitting unit that splits the scanned light beam into two light beams depending on a state of polarization, and an angle-of-rotation control unit that controls an angle of rotation of the laser light from the scanning unit depending on an incident angle on the splitting unit.

However, the optical scanning device disclosed in Japanese Patent Application Laid-open No. 2008-70599 is disadvantageous in that when the incident angle of light incident on the optical-path branching unit is large, performance of the optical-path branching unit in polarization splitting can degrade.

The optical scanning device disclosed in Japanese Patent Application Laid-open No. 2008-116965 is disadvantageous in that it is difficult to achieve sufficient performance in splitting polarized light by using the optical element that includes the microstructure grating.

The recording apparatus disclosed in Japanese Patent Application Laid-open No. S60-32019 is disadvantageous in that an electric-field vector of P-polarized light that is expected to transmit through the polarization splitting unit is not parallel to a transmission axis of a beam-splitting surface in some cases, where a portion of incident light is undesirably reflected from the polarization splitting unit.

The optical scanning device disclosed in Japanese Patent Application Laid-open No. H7-144434 is disadvantageous in that employment of a magnetic optical element as the angle-of-rotation control unit leads to higher cost. Moreover, the act of performing the control of the angle of rotation entails increases power consumption and it leads to more heat generation. It is difficult to control the optical scanning device so as to provide its performance stably because the angle of rotation is likely to fluctuate with environmental conditions such as a temperature.

SUMMARY OF THE INVENTION

It is an object of the present invention to at least partially solve the problems in the conventional technology.

According to an aspect of the present invention, there is provided a polarization splitting device that splits a first light and a second light of different polarization directions. The polarization splitting device includes a polarization beam splitter configured to allow the first light beam to transmit therethrough and to reflect the second light beam, the polarization beam splitter having a polarization splitting surface on which a microstructure grating with grating pitch smaller than wavelength of incident light is formed; and a first polarizer arranged on an optical path of the second light beam reflected from the polarization beam splitter, the first polarizer having a transmission axis that is parallel to a polarization direction of the second light beam.

According to another aspect of the present invention, there is provided an optical scanning device that scans a plurality of surfaces to be scanned with light beams. The optical scanning device includes a light source unit that emits a plurality of light beams including a first light beam and a second light beam of different polarization directions; a deflector that deflects the first light beam and the second light beam emitted from the light source unit; and an optical scanning system that causes the first light beam and the second light beam deflected by the deflector to be converged onto a corresponding one of the surfaces to be scanned, the optical scanning system including a polarization splitting device that splits the first light beam and the second light beam from each other, the polarization splitting device including a polarization beam splitter configured to allow the first light beam to transmit therethrough and to reflect the second light beam, the polarization beam splitter having a polarization splitting surface on which a microstructure grating with grating pitch smaller than wavelength of incident light is formed; and a first polarizer arranged on an optical path of light reflected from the polarization beam splitter, the first polarizer having a transmission axis that is parallel to a polarization direction of the second light beam.

According to still another aspect of the present invention, there is provided an image forming apparatus including a plurality of image carriers; and the above optical scanning apparatus, the optical scanning apparatus scanning the image carriers with light beams.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 17A and 17B are schematic diagrams for explaining outgoing light (transmitted light, reflected light) from a polarization splitting device that employs a polarization beam splitter whose polarization splitting surface is formed with dielectric multilayer;

FIGS. 18A and 18B are schematic diagrams for explaining outgoing light (transmitted light, reflected light) from a polarization splitting device that employs a polarization beam splitter whose polarization splitting surface is formed with a microstructure grating smaller than wavelength of incident light;

DETAILED DESCRIPTION OF THE PREFERRED EMBODIMENTS

Exemplary embodiments of the present invention are described in detail below with reference to the drawings.

Figure 1:
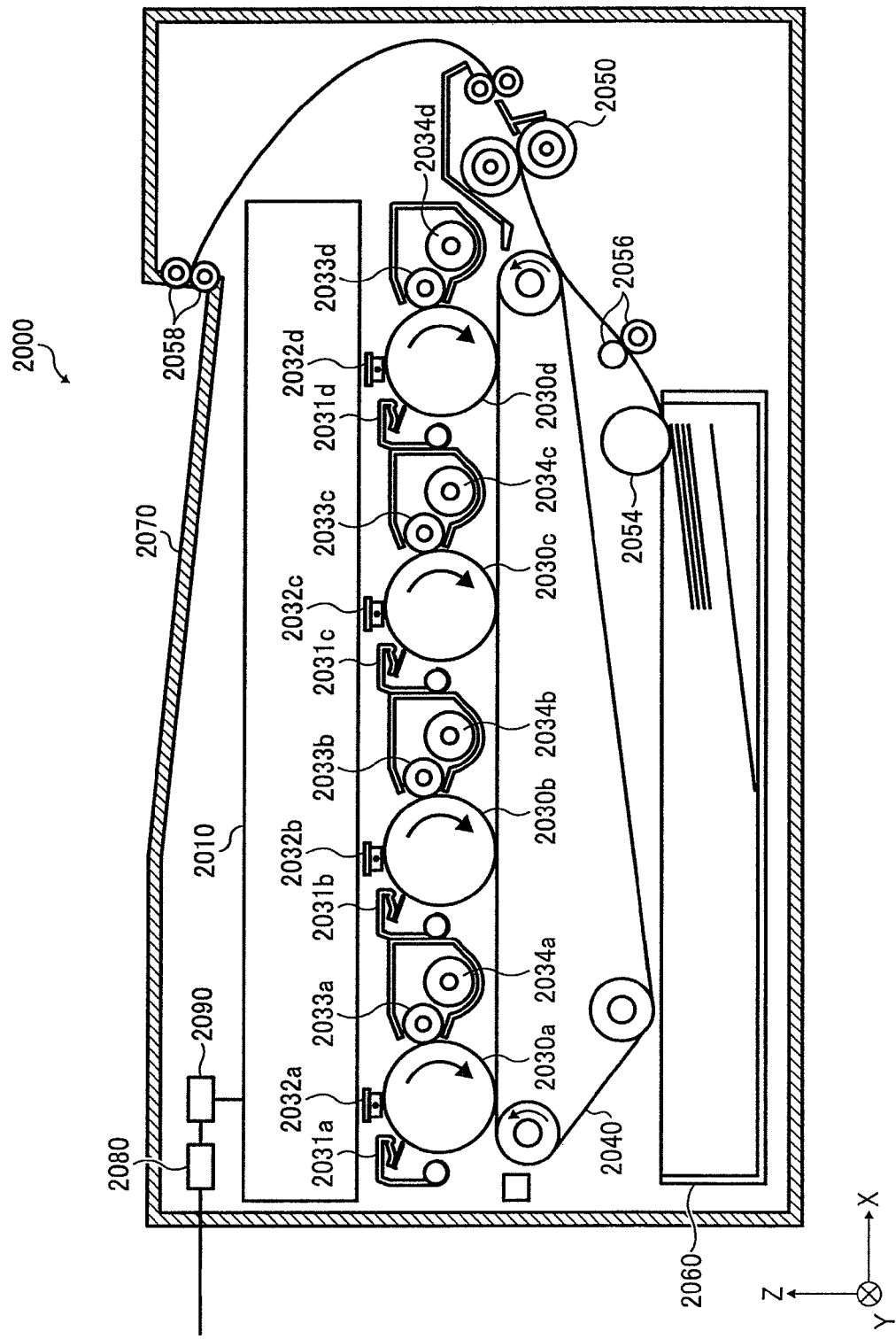
FIG. 1 is a schematic diagram of a color printer according to an embodiment of the present invention.

FIG. 1 is a schematic diagram of a color printer 2000 according to an embodiment. The color printer 2000 is a tandem-type multi-color printer that forms a full-color image by superimposing images of four colors (black, cyan, magenta, and yellow) on one another. The color printer 2000 includes an optical scanning device 2010, four photosensitive drums (2030a, 2030b, 2030c, and 2030d), four cleaning units (2031a, 2031b, 2031c, and 2031d), four electrostatic chargers (2032a, 2032b, 2032c, and 2032d), four developing rollers (2033a, 2033b, 2033c, and 2033d), four toner cartridges (2034a, 2034b, 2034c, and 2034d), a transfer belt 2040, a pair of fixing rollers 2050, a sheet feeding roller 2054, a pair of registration rollers 2056, a pair of sheet delivery rollers 2058, a sheet feed tray 2060, a sheet output tray 2070, a communication control device 2080, and a printer control device 2090 that performs centralized control of these units.

The communication control device 2080 controls communication to and from a host apparatus (for example, a personal computer) via a network or the like.

The photosensitive drum 2030a, the electrostatic charger 2032a, the developing roller 2033a, the toner cartridge 2034a, and the cleaning unit 2031a, which are used as a set, form an image forming station that forms a black image (hereinafter, referred to as "K station" for brevity in some cases).

The photosensitive drum 2030b, the electrostatic charger 2032b, the developing roller 2033b, the toner cartridge 2034b, and the cleaning unit 2031b, which are used as a set, form an image forming station that forms a cyan image (hereinafter, referred to as "C station" for brevity in some cases).

The photosensitive drum 2030c, the electrostatic charger 2032c, the developing roller 2033c, the toner cartridge 2034c, and the cleaning unit 2031c, which are used as a set, form an image forming station that forms a magenta image (hereinafter, referred to as "M station" for brevity in some cases).

The photosensitive drum 2030d, the electrostatic charger 2032d, the developing roller 2033d, the toner cartridge 2034d, and the cleaning unit 2031d, which are used as a set, form an image forming station that forms a yellow image (hereinafter, referred to as "Y station" for brevity in some cases).

A photosensitive layer is formed on each of the photosensitive drums. In other words, the surface of each of the photosensitive drums is the target surface to be scanned. Each of the photosensitive drums is rotated by a rotating mechanism (not shown) in the plane of FIG. 1 in a direction indicated by arrows. In this specification, in a XYZ, three-dimensional rectangular coordinate system, a direction in which the four photosensitive drums are arranged is taken as the X-axis direction and the longitudinal direction of each of the photosensitive drums is taken as the Y-axis direction.

Each of the four electrostatic chargers causes the surface of a corresponding one of the photosensitive drums to be uniformly electrostatically charged.

The optical scanning device 2010 irradiates the surface of each of the photosensitive drums with light that is optically modulated on a color-by-color basis based on multiple-color image data (black image data, cyan image data, magenta image data, and yellow image data) fed from the host apparatus. This cancels out electric charges on only areas irradiated with light, thereby forming a latent image according to the image data on the surface of each of the photosensitive drums. The thus-formed latent image is moved toward a corresponding one of the developing rollers as the photosensitive drum rotates. The structure of the optical scanning device 2010 will be descried later.

Black toner, which is to be supplied to the developing roller 2033a, is contained in the toner cartridge 2034a. Cyan toner, which is to be supplied to the developing roller 2033b, is contained in the toner cartridge 2034b. Magenta toner, which is to be supplied to the developing roller 2033c, is contained in the toner cartridge 2034c. Yellow toner, which is to be supplied to the developing roller 2033d, is contained in the toner cartridge 2034d.

The toner in a corresponding one of the toner cartridges is uniformly and lightly applied to the surface of each of the developing rollers as the developing roller rotates. When the developing roller comes into contact with the surface of the corresponding photosensitive drum, the toner on the surface of the developing roller is transferred only onto the irradiated area of the surface and sticks to the area. Put another way, each of the developing rollers applies toner onto the latent image formed on the surface of the corresponding photosensitive drum, thereby developing the latent image into a visible image. The image to which the toner sticks (hereinafter, referred to as "toner image" for brevity) moves toward the transfer belt 2040 as the photosensitive drum rotates.

The toner images of yellow, magenta, cyan, and black are sequentially transferred onto the transfer belt 2040 at predetermined timing to be superimposed on one another, thereby forming a full-color image.

One or more sheets of recording medium are contained in the sheet feed tray 2060. The sheet feeding roller 2054 is arranged near the sheet feed tray 2060. The sheet feeding roller 2054 picks up a sheet of the recording medium (hereinafter, "sheet") at a time from the sheet feed tray 2060 and feeds the sheet to the registration rollers 2056. The registration rollers 2056 feed the sheet toward the transfer belt 2040 at predetermined timing. Accordingly, the full-color image on the transfer belt 2040 is transferred onto the sheet. The sheet onto which the image is transferred is fed to the fixing rollers 2050.

The fixing rollers 2050 apply heat and pressure to the sheet, thereby fixing the toner onto the sheet. The sheet, to which the toner is fixed, is delivered to the sheet output tray 2070 by the sheet delivery rollers 2058 and stacked on the sheet output tray 2070 in the delivered order.

Each of the cleaning units removes toner (residual toner) that remains on the surface of the corresponding photosensitive drum. The surface of the photosensitive drum, from which the residual toner is removed, returns to a position where the surface opposes the corresponding electrostatic charger.

The structure of the optical scanning device 2010 will be described below.

Figure 2:
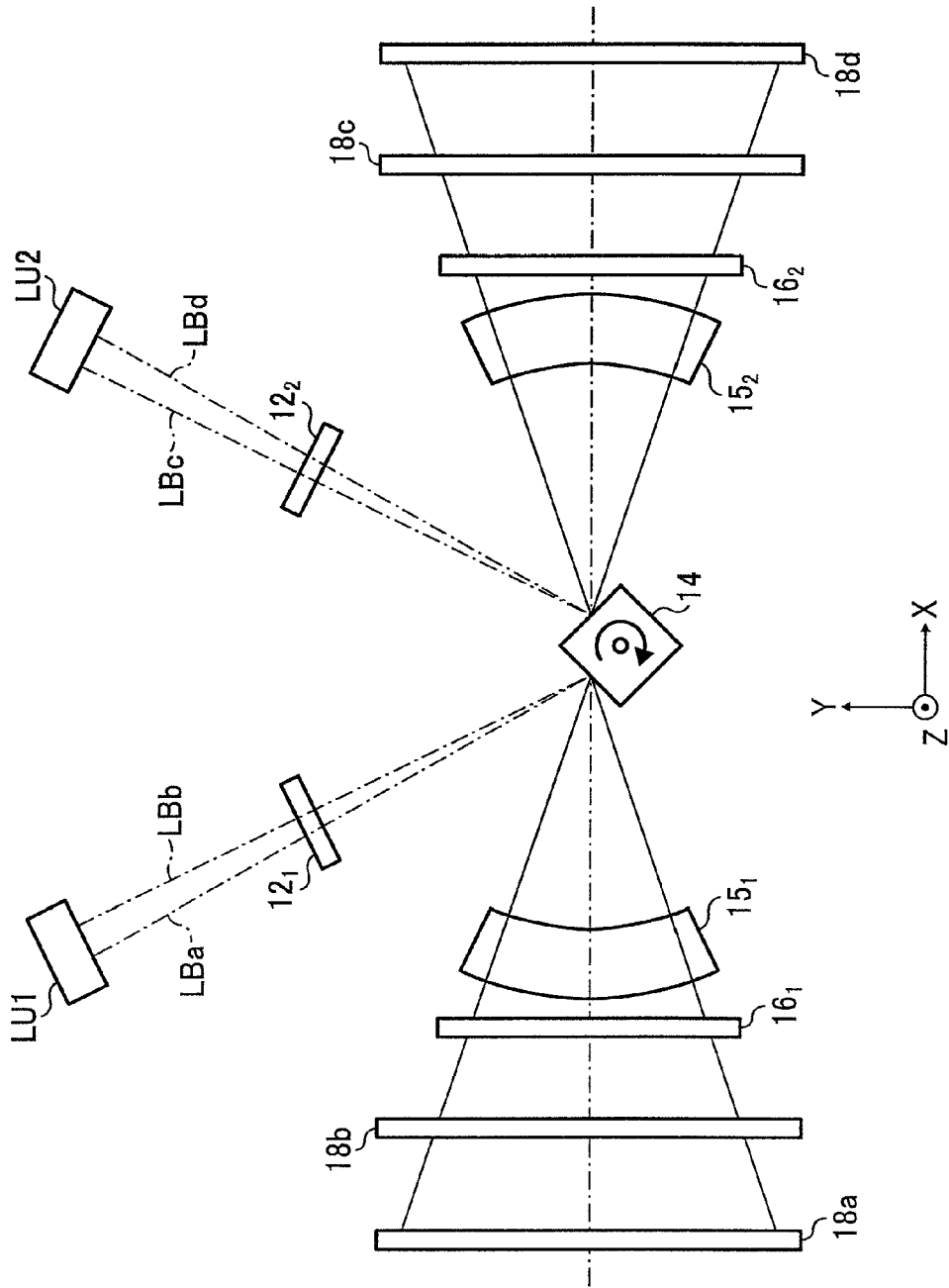
FIG. 2 is a first schematic diagram for explaining an optical scanning device.
Figure 3:
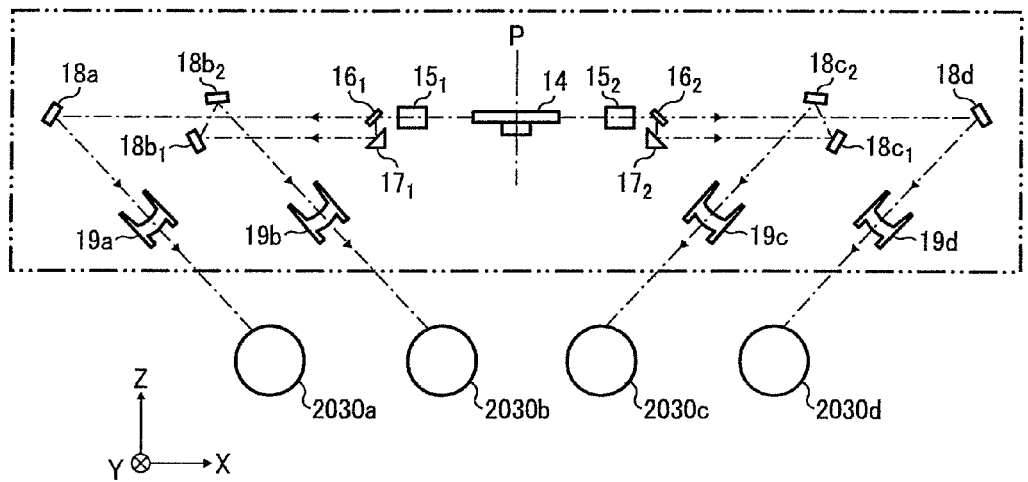
FIG. 3 is a second schematic diagram for explaining the optical scanning device.

The optical scanning device 2010 includes, for example, as depicted in FIGS. 2 and 3, the two light source units (LU1 and LU2), two cylindrical lenses ($12_1$ and $12_2$), a polygon mirror 14, two fθ lenses ($15_1$ and $15_2$), the two polarization splitting devices ($16_1$ and $16_2$), two reflecting mirrors ($17_1$ and $17_2$), a plurality of reflection mirrors ($18a$, $18b_1$, $18b_2$, $18c_1$, $18c_2$, and $18d$), four anamorphic lenses ($19a$, $19b$, $19c$, and $19d$), and a scanning control device (not shown). Hereinafter, a direction corresponding to the main-scanning direction is simply referred as "main-scanning direction" while a direction corresponding to the sub-scanning direction is simply referred to as "sub-scanning direction."

Figure 4:
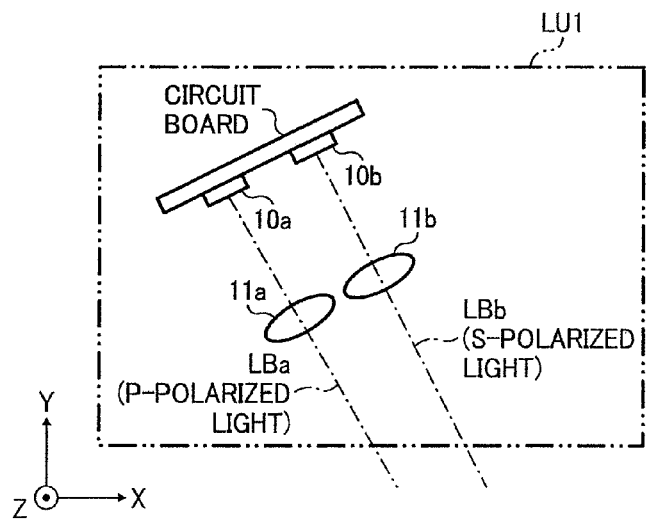
FIG. 4 is a schematic diagram for explaining a light source unit LU1.

The light source unit LU1 includes, for example, as depicted in FIG. 4, two light sources ($10a$ and $10b$) and two collimating lenses ($11a$ and $11b$).

Figure 5:
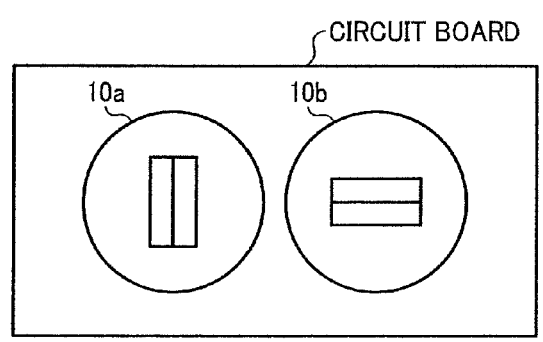
FIG. 5 is a schematic diagram for explaining a light source in the light source unit LU1.

The light source $10a$ and the light source $10b$ are light sources equivalent to each other. The light source $10a$ and the light source $10b$ are arranged on a circuit board such that polarization directions of light beams emitted from the light sources $10a$ and $10b$ are perpendicular to each other. More specifically, for example, as depicted in FIG. 5, the light sources are mounted on the circuit board such that one of the light sources is oriented at 90 degrees with the other one of the light sources. In the following description, it is assumed that the light source $10a$ emits P-polarized light while the light source $10b$ emits S-polarized light.

The collimating lens $11a$ is arranged on an optical path of a light beam LBa emitted from the light source $10a$ and substantially collimates the light beam LBa.

The collimating lens $11b$ is arranged on an optical path of a light beam LBb emitted from the light source $10b$ and substantially collimates the light beam LBb.

Figure 6:
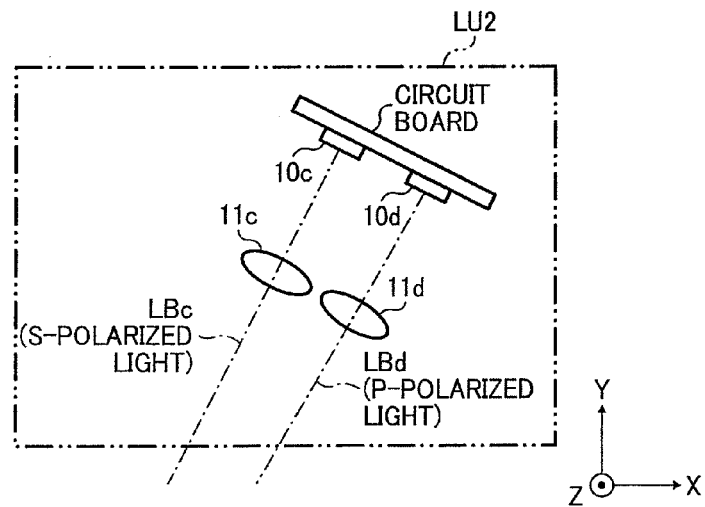
FIG. 6 is a schematic diagram for explaining a light source unit LU2.

The light source unit LU2 includes, for example, as depicted in FIG. 6, two light sources $10c$ and $10d$ and two collimating lenses $11c$ and $11d$.

Figure 7:
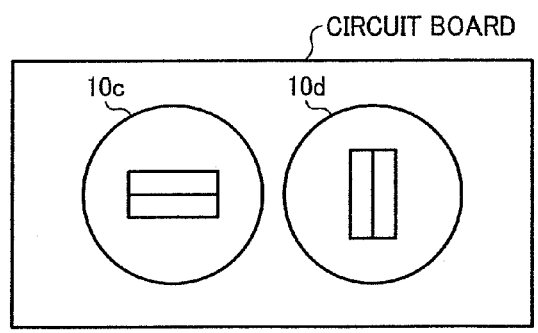
FIG. 7 is a schematic diagram for explaining a light source in the light source unit LU2.

The light source $10c$ and the light source $10d$ are light sources equivalent to each other. The light source $10c$ and the light source $10d$ are arranged on a circuit board such that polarization directions of light beams emitted from the light sources $10c$ and $10d$ are perpendicular to each other. More specifically, for example, as depicted in FIG. 7, the light sources are mounted on the circuit board such that one of the light sources is oriented at 90 degrees with the other one of the light sources. In the following description, it is assumed that the light source $10c$ emits P-polarized light while the light source $10d$ emits S-polarized light.

The collimating lens $11c$ is arranged on an optical path of a light beam LBc emitted from the light source $10c$ and substantially collimates the light beam LBc.

The collimating lens $11d$ is arranged on an optical path of a light beam LBd emitted from the light source $10b$ and substantially collimates the light beam LBd.

Returning to the explanation of FIG. 2, the cylindrical lens $12_1$ causes the light beams emitted from the light source unit LU1 to be converged in terms of the Z-axis direction to a position near a deflecting mirror surface of the polygon mirror 14.

The cylindrical lens $12_2$ causes the light beams emitted from the light source unit LU2 to be converged in terms of the Z-axis direction to a position near a deflecting mirror surface of the polygon mirror 14.

The polygon mirror 14 includes, for example, four side mirrors each of which serves as the deflecting mirror surface. The polygon mirror 14 rotates about an axis parallel to the Z-axis at a constant rotation speed and deflects a light beam traveling from each of the cylindrical lenses at substantially a constant angular velocity in a plane parallel to the X-Y plane. A light beam traveling from the cylindrical lens $12_1$ is deflected in the negative X direction relative to the polygon mirror 14 while a light beam traveling from the cylindrical lens $12_2$ is deflected in the positive X direction relative to the polygon mirror 14. Meanwhile, a pencil-of-light-rays plane that contains trajectories of light beams deflected by the deflecting mirror surface of the polygon mirror 14 at different points in time is referred to as a "plane of deflected light" (see Japanese Patent Application Laid-open No. H11-202252). In the example of FIG. 2, the plane of deflected light is parallel to the X-Y plane.

The fθ lens $15_1$ is arranged on the negative side of the polygon mirror 14 in the X direction as well as on the optical path of a light beam deflected by the polygon mirror 14 after having passed through the cylindrical lens $12_1$.

Figure 8:
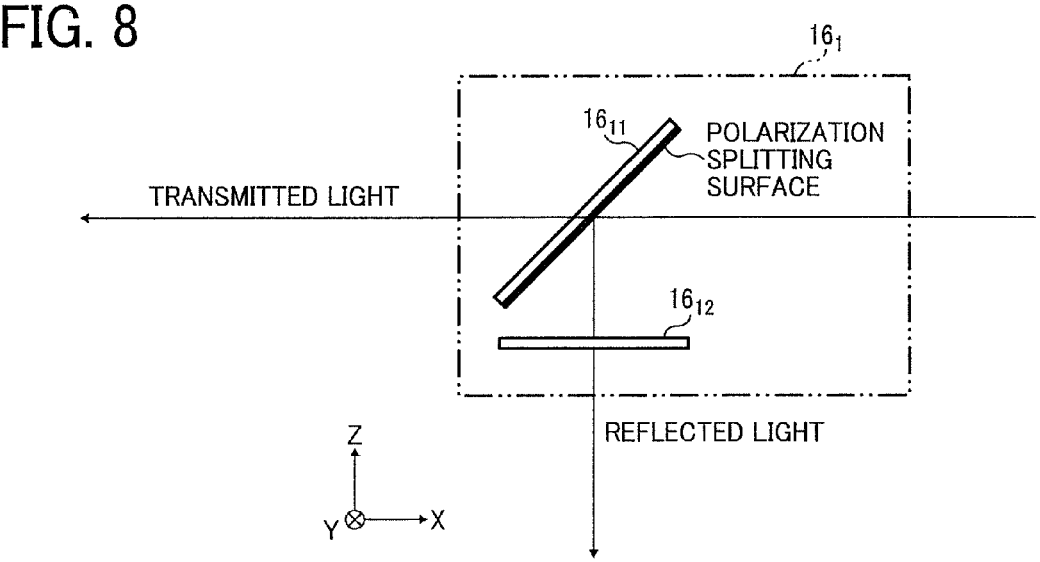
FIG. 8 is a schematic diagram for explaining the structure of a polarization splitting device $16_1$.
Figure 9A:
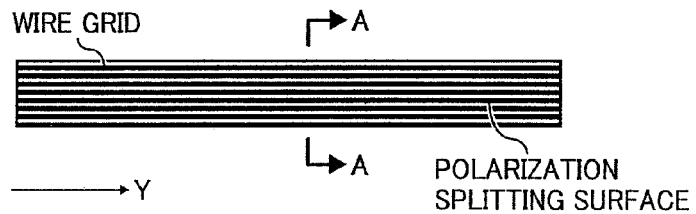
FIGS. 9A to 9C are schematic diagrams for explaining a polarization beam splitter.
Figure 9B:
Figure 9C:
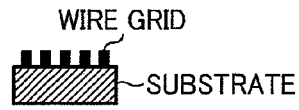

The polarization splitting device $16_1$ includes, for example, as depicted in FIG. 8, a polarization beam splitter $16_{11}$ and a polarizer $16_{12}$ that is arranged on the negative side of polarization beam splitter $16_{11}$ in the Z direction. The polarization beam splitter $16_{11}$ is, for example, as depicted in FIGS. 9A to 9C, a wire grid polarizer that includes a plate-like substrate and a wire grid that is formed on the substrate as a microstructure grating whose grating pitch is smaller than the wavelength of incident light. FIG. 9C is a schematic cross-sectional view of FIG. 9A taken along line A-A.

Figure 10:
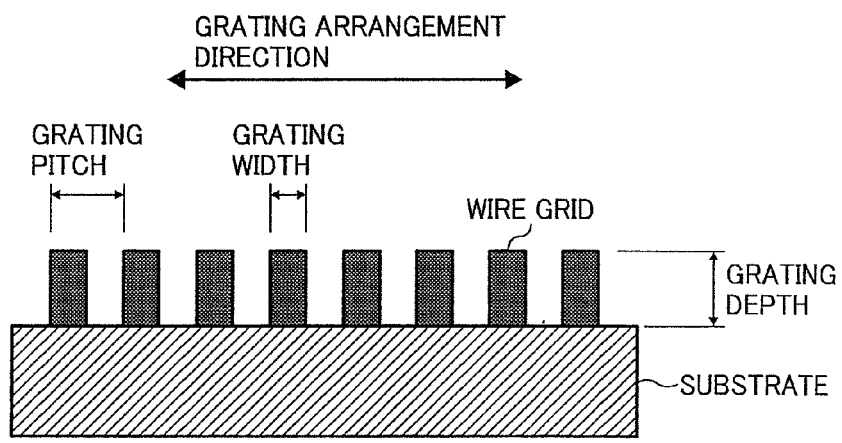
FIG. 10 is a schematic diagram for explaining a grating pitch and a grating depth of the polarization beam splitter.

For example, a grating pitch of the wire grid is 0.15 μm, a duty ratio, which is a ratio of a wire width to the grating pitch, is 50%, and a grating depth is 0.05 μm (see FIG. 10). The wire is made from aluminum. The substrate is made of a transparent material such as glass and a rigid resin.

Figure 11:
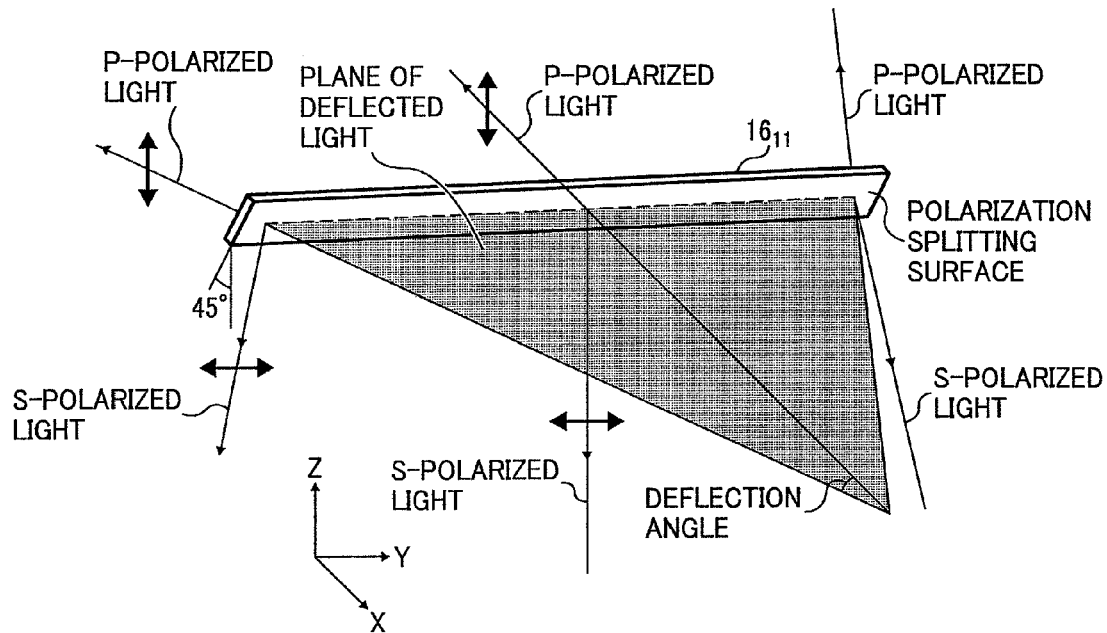
FIG. 11 is a schematic diagram for explaining a polarization splitting surface of the polarization beam splitter.

The polarization beam splitter $16_{11}$ includes the surface, on which the wire grid is formed, that serves as the polarization splitting surface, allows P-polarized light to transmit therethrough, and reflects S-polarized light (see FIG. 11).

The polarizer $16_{12}$ is a polarizer of which transmission axis is parallel to the polarization direction of the S-polarized light.

Figure 12:
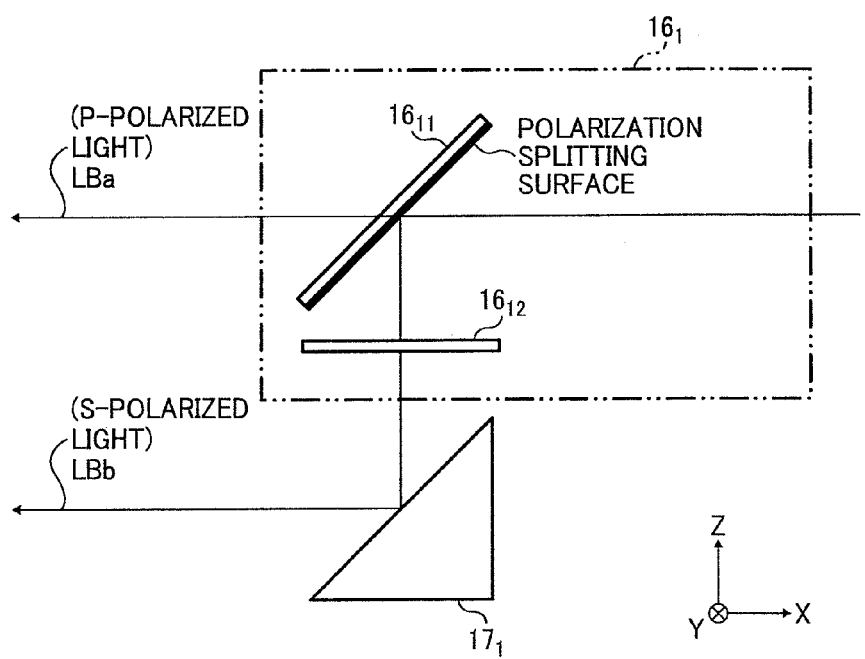
FIG. 12 is a schematic diagram for explaining how the polarization splitting device $16_1$ and a reflecting mirror $17_1$ function.
Figure 13:
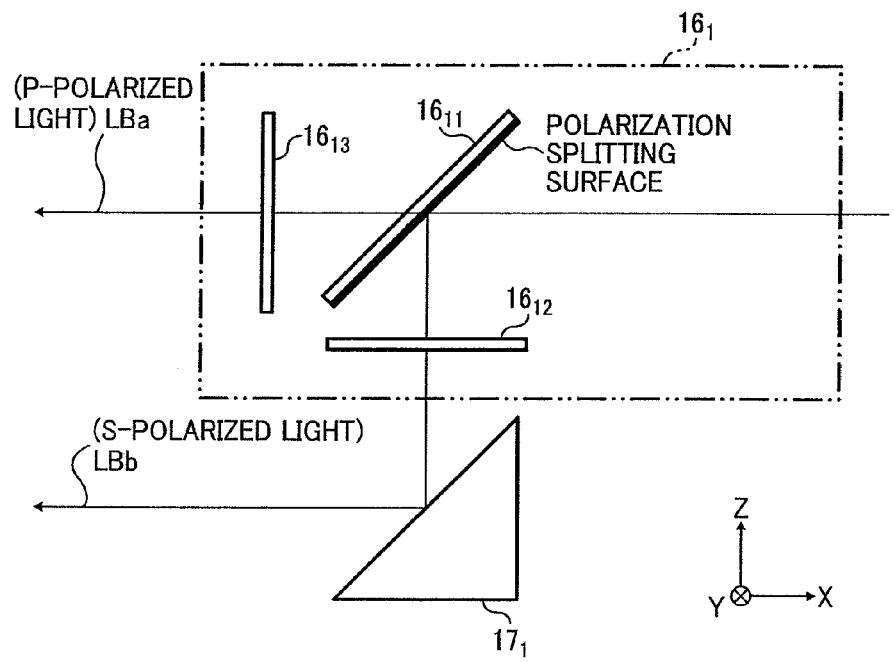
FIG. 13 is a schematic diagram for explaining addition of a polarizer $16_{13}$ on a transmission side of a polarization beam splitter $16_{11}$.

The polarization splitting device $16_1$ is arranged on the negative side of the fθ lens $15_1$ in the X direction as well as on an optical path of light beams (in this example, the light beam LBa and the light beam LBb) passed through the fθ lens $15_1$. The polarization beam splitter $16_{11}$ is arranged so as to reflect the S-polarized light in the negative Z direction. In this example, as depicted in FIG. 12, the light beam LBa transmits through the polarization beam splitter $16_{11}$ because the light beam LBa passed through the fθ lens $15_1$ is P-polarized light while the light beam LBb is reflected by the polarization beam splitter $16_{11}$ in the negative Z direction because the light beam LBb passed through the fθ lens $15_1$ is S-polarized light. The S-polarized light further transmits through the polarizer $16_{12}$. Addition of the polarizer $16_{13}$, of which transmission axis is parallel to the polarization direction of the P-polarized light, on the optical path of the light beam transmitted through the polarization beam splitter $16_{11}$ can further enhance capability of reducing the amount of ghost light. The polarization splitting device of this arrangement is depicted in FIG. 13. In the present specification, a light beam that is failed to be separated by the polarization beam splitters and in an undesired state of polarization is referred to as "ghost light."

Returning to FIG. 3, a light beam (in this example, the light beam LBa) transmitted through the polarization splitting device $16_1$ is reflected by the reflection mirror 18a and passes through the anamorphic lens 19a to be incident on the surface of the photosensitive drum 2030a, thereby forming a light spot. The light spot moves in the longitudinal direction of the photosensitive drum 2030a as the polygon mirror 14 rotates. In other words, the light spot scans the surface of the photosensitive drum 2030a. The direction in which the light spot moves in this manner is the "main-scanning direction" of the photosensitive drum 2030a while the direction in which the photosensitive drum 2030a rotates is the "sub-scanning direction" of the photosensitive drum 2030a.

The fθ lens $15_1$, the polarization splitting device $16_1$, the reflection mirror 18a, and the anamorphic lens 19a form a scanning optical system of the "K station."

Meanwhile, a light beam (in this example, the light beam LBb) reflected by the polarization splitting device $16_1$ in the negative Z direction is reflected by the reflecting mirrors $17_1$ in the negative X direction, thereafter reflected by the reflection mirror $18b_1$ and the reflection mirror $18b_2$, and passes through the anamorphic lens 19b to be incident on the surface of the photosensitive drum 2030b, thereby forming a light spot. The light spot moves in the longitudinal direction of the photosensitive drum 2030b as the polygon mirror 14 rotates. In other words, the light spot scans the surface of the photosensitive drum 2030b. The direction in which the light spot moves in this manner is the "main-scanning direction" of the photosensitive drum 2030b while the direction in which the photosensitive drum 2030b rotates is the "sub-scanning direction" of the photosensitive drum 2030b.

The fθ lens $15_1$, the polarization splitting device $16_1$, the reflecting mirrors $17_1$, the reflection mirror $18b_1$, the reflection mirror $18b_2$, and the anamorphic lens 19b form a scanning optical system of the "C station."

Accordingly, the fθ lens $15_1$ and the polarization splitting device $16_1$ are shared by two image forming stations K and C.

Returning to FIG. 2, the fθ lens $15_2$ is arranged on the positive side of the polygon mirror 14 in the X direction as well as on an optical path of a light beam deflected by the polygon mirror 14 after having passed through the cylindrical lens $12_2$.

Figure 14:
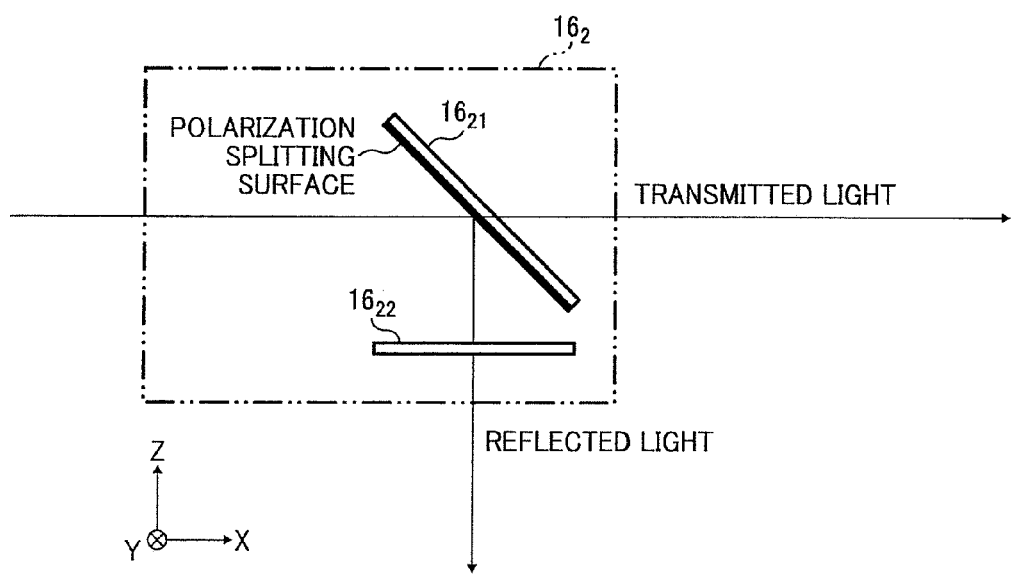
FIG. 14 is a schematic diagram for explaining the structure of a polarization splitting device $16_2$.

The polarization splitting device $16_2$ is a polarization splitting device similar to the polarization splitting device $16_1$ described above. The polarization splitting device $16_2$ includes, for example, as depicted in FIG. 14, a polarization beam splitter $16_{21}$ and a polarization beam splitter $16_{22}$ that is arranged on the negative side of the polarization beam splitter $16_{21}$ in the Z direction.

The polarization beam splitter $16_{21}$ includes the surface, on which the wire grid is formed, that serves as the polarization splitting surface, allows P-polarized light to pass therethrough, and reflects S-polarized light.

The polarizer $16_{22}$ is a polarizer of which transmission axis is parallel to the polarization direction of the S-polarized light.

Figure 15:
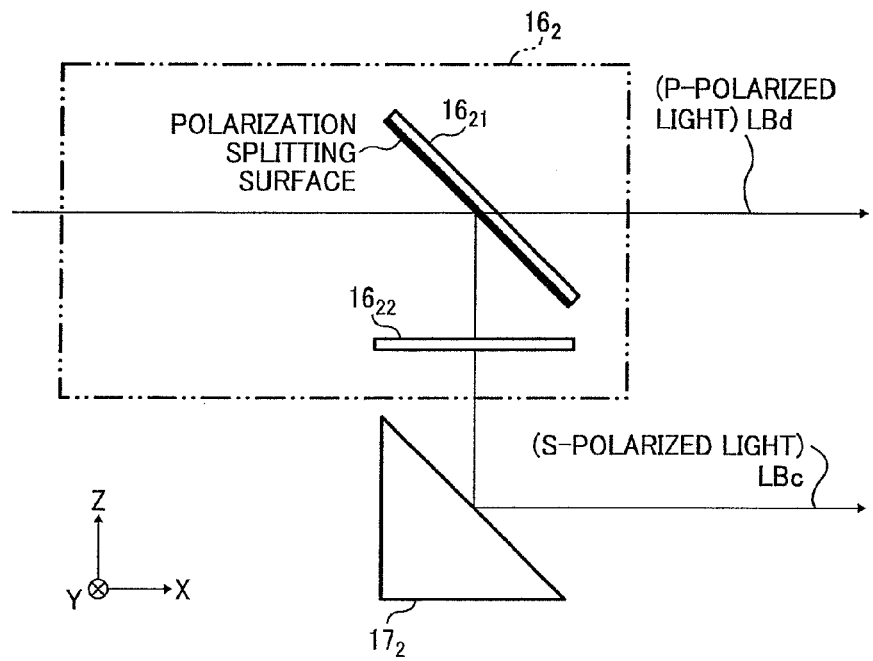
FIG. 15 is a schematic diagram for explaining how the polarization splitting device $16_2$ and a reflecting mirror $17_2$ function.

The polarization splitting device $16_2$ is arranged on the positive side of the fθ lens $15_2$ in the X direction as well as on the optical path of a light beam (in this example, the light beam LBc and the light beam LBd) passed through the fθ lens $15_2$. The polarization beam splitter $16_{21}$ is arranged so as to reflect the S-polarized light in the negative Z direction. As depicted in FIG. 15, because the light beam LBc passed through the fθ lens $15_2$ is S-polarized light, the light beam LBc is reflected by the polarization beam splitter $16_{21}$ in the negative Z direction and thereafter transmits through the polarization beam splitter $16_{22}$. Because the light beam LBd passed through the fθ lens $15_2$ is P-polarized light, the light beam LBd transmits through the polarization beam splitter $16_{21}$. Addition of a polarizer, of which transmission axis is parallel to the polarization direction of the P-polarized light, on an optical path of a light beam transmitted through the polarization beam splitter $16_{21}$ can further enhance the capability of reducing the amount of ghost light.

Returning to FIG. 3, a light beam (in this example, the light beam LBc) reflected by the polarization splitting device $16_2$ in the negative Z direction is reflected by reflecting mirrors $17_2$ in the positive X direction, thereafter reflected by the reflection mirror $18c_1$ and the reflection mirror $18c_2$, and passes through the anamorphic lens 19c to be incident on the surface of the photosensitive drum 2030c, thereby forming a light spot. The light spot moves in the longitudinal direction of the photosensitive drum 2030c as the polygon mirror 14 rotates. In other words, the light spot scans the surface of the photosensitive drum 2030c. The direction in which the light spot moves in this manner is the "main-scanning direction" of the photosensitive drum 2030c while the direction in which the photosensitive drum 2030c rotates is the "sub-scanning direction" of the photosensitive drum 2030c.

The fθ lens $15_2$, the polarization splitting device $16_2$, the reflecting mirrors $17_2$, the reflection mirror $18c_1$, the reflection mirror $18c_2$, and the anamorphic lens 19c form a scanning optical system of the "M station."

Meanwhile, a light beam (in this example, the light beam LBd) is reflected by the reflection mirror 18d and passes through the anamorphic lens 19d to be incident on the surface of the photosensitive drum 2030d, thereby forming a light spot. The light spot moves in the longitudinal direction of the photosensitive drum 2030d as the polygon mirror 14 rotates. In other words, the light spot scans the surface of the photosensitive drum 2030d. The direction in which the light spot moves in this manner is the "main-scanning direction" of the photosensitive drum 2030d while the direction in which the photosensitive drum 2030d rotates is the "sub-scanning direction" of the photosensitive drum 2030d.

The fθ lens $15_2$, the polarization splitting device $16_2$, the reflection mirror 18d, and the anamorphic lens 19d form a scanning optical system of the "Y station."

Accordingly, the fθ lens $15_2$ and the polarization splitting device $16_2$ are shared by two image forming stations M and Y.

In the present embodiment, each of the fθ lenses is arranged between the polygon mirror and a corresponding one of the polarization beam splitters. Because the optical path of the P-polarized light and the optical path of the S-polarized light is superimposed on each other in terms of the Z-axis direction, a thinner fθ lens can be employed.

The structure and function of the polarization beam device will be described by way of comparison with those of a conventional example.

Conventionally, various polarization beam splitters that includes a polarization splitting surface, on which dielectric multilayer is formed, have been put into actual use. The dielectric multilayer of the polarization beam splitter is designed such that light is incident on the dielectric multilayer at the Brewster's angle and P-polarized light passes through the dielectric layer while S-polarized light is reflected by the dielectric multilayer. When this polarization beam splitter is employed as the polarization beam splitter $16_{11}$ of the scanning optical system, poor splitting of different polarization light can occur depending on incident angle, which can cause ghost light to appear. Furthermore, even when the polarizer $16_{12}$ is arranged downstream of the polarization beam splitter $16_{11}$, the ghost light still appears. The reason for this will be described below.

Figure 16:
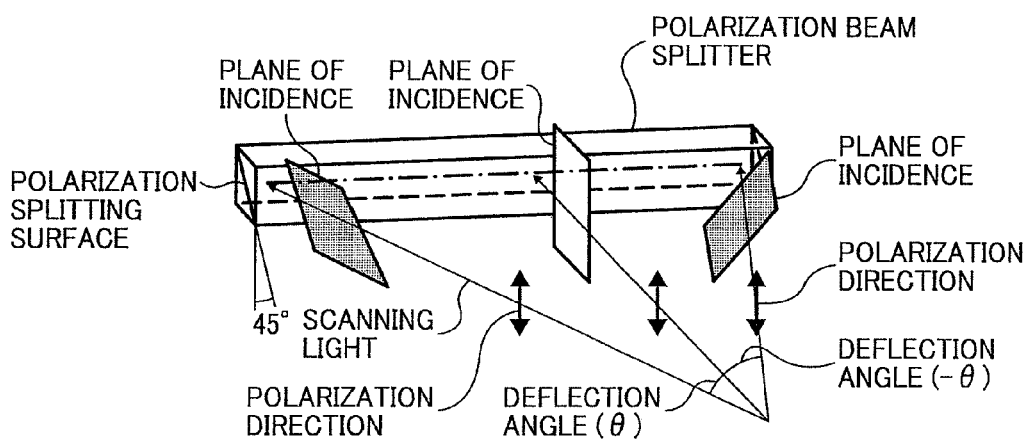
FIG. 16 is a schematic diagram for explaining how a plane of incidence tilts at positions where scanning light is incident on a polarization beam splitter.

When a polarization beam splitter that includes dielectric multilayer (hereinafter, "dielectric-multilayer polarization splitter") is incorporated as a polarization splitting device in an optical scanning device, for example, as depicted in FIG. 16, an angle of a plane of incidence (plane that contains a principal ray of an incident light beam and the normal to the polarization splitting surface at an incident position) makes with a polarization direction varies depending on a position where light is incident on the polarization splitting device. Accordingly, a polarization component parallel to the plane of incidence passes through the polarization beam splitter while a polarization component perpendicular to the plane is reflected by the polarization beam splitter. Put another way, polarization direction of transmitted light varies depending on the position. How the polarization direction varies is illustrated in detail FIGS. 17A and 17B.

FIGS. 17A and 17B are schematic diagrams of polarization directions and planes of incidence of these scanning light beams that are deflected by a deflector at different deflection angles and then travel toward a polarization splitting device as viewed from the side of the deflector. FIGS. 17A and 17B depict incidence of the light beam LBa and incidence of the light beam LBb, respectively. At any position where the deflection angle is not zero degrees, a transmitted light component and a reflected light component of the light beam LBa exit in the same state of polarization. The same goes for the light beam LBb. Accordingly, even when a polarizer is arranged downstream of the polarization splitting device, these light components cannot be split by the polarizer.

In contrast, when a polarization beam splitter that includes, on its surface, a microstructure grating smaller than the wavelength of incident light is employed as the polarization beam splitter, polarization direction of outgoing light is independent on an orientation of a plane of incidence. Therefore, even when ghost light is produced, polarization direction of the incident light remains the same. A relation between the polarization directions and the incident light is illustrated in FIGS. 18A and 18B. FIGS. 18A and 18B depict incidence of the light beam LBa and incidence of the light beam LBb, respectively. Accordingly, setting a transmission axis of a polarizer to be parallel to the polarization direction of signal light allows reducing the amount of ghost light, thereby reducing the amount of ghost light efficiently at any incident angle. Combined use of a polarization beam splitter, on which a microstructure grating whose grating pitch is smaller than the wavelength of incident light is formed, and a polarizer provides an effect that is not provided by a combination of a conventionally-used polarization beam splitter that has a dielectric multilayer structure and a deflector.

A resultant amount of ghost light that is reduced by using the polarization beam splitter according to the present embodiment (hereinafter, "wire-grid polarization splitter") that employs a wire-grid element that includes, on its surface, a microstructure grating whose grating pitch is smaller than the wavelength of incident light in comparison with a resultant amount of ghost light that is reduced by using a dielectric-multilayer polarization splitter, which has already been in actual use, will be described below.

Figure 19:
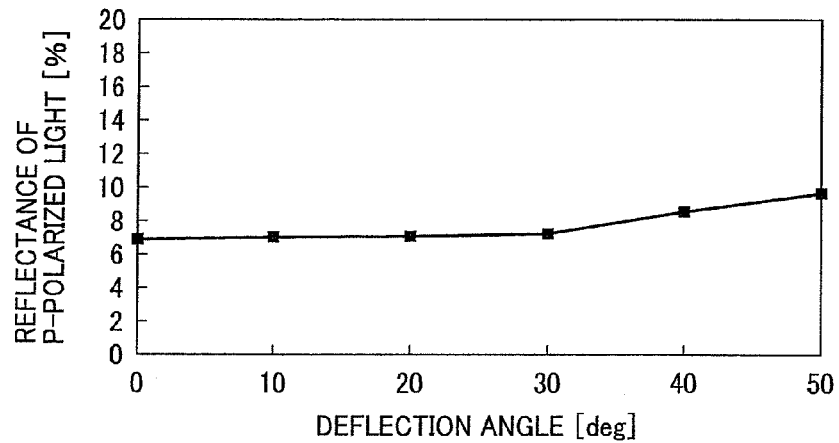
FIG. 19 is a graph for explaining a result of actual measurement of a relationship between deflection angles and reflectances of P-polarized light of a polarization splitting device without a polarizer.
Figure 20:
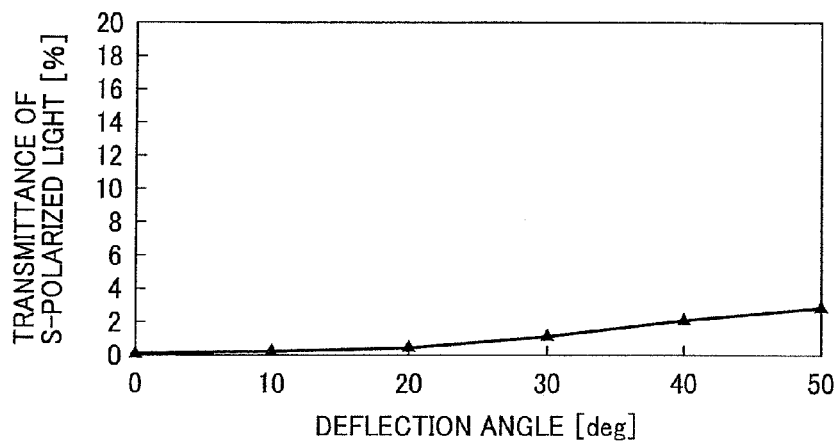
FIG. 20 is a graph for explaining a result of actual measurement of a relationship between deflection angles and transmittances of S-polarized light of the polarization splitting device without the polarizer.

FIG. 19 is a graph of a result of actual measurement of a relationship between deflection angles and reflectances of P-polarized light, the measurement made in a state where a polarization splitting surface of the wire-grid element is tilted at 45 degrees relative to a plane of deflected light. FIG. 20 is a graph of a result of actual measurement of a relationship between deflection angles and transmittances of S-polarized light in the same state. Because the polarization beam splitter is designed so as to cause P-polarized light to transmit therethrough and S-polarized light be reflected therefrom, the light whose values are plotted on the graphs corresponds to the ghost light, which is desirably minimized. The graphs indicate that the larger the magnitude (absolute value) of the deflection angle, the larger both the reflectance of the P-polarized light and the transmittance of the S-polarized light. In particular, the reflectance of the P-polarized light is at a relatively high level.

Figure 21:
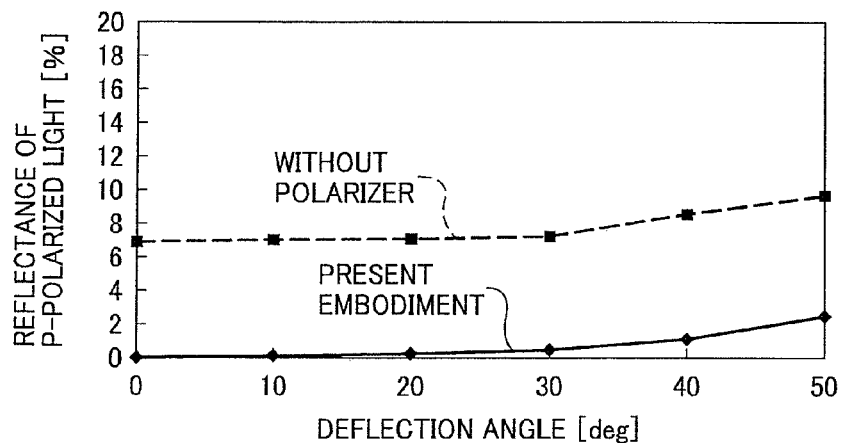
FIG. 21 is a graph for explaining a result of actual measurement of a relationship between deflection angles and reflectances of P-polarized light of the polarization splitting device according to the embodiment.

FIG. 21 is a graph of a relationship between deflection angles and reflectances of incident P-polarized light, the measurement made in a state where a polarizer whose transmittance axis is parallel to the polarization direction of the S-polarized light arranged for light reflected from the polarization beam splitter. The dotted line in FIG. 21 indicates the result of the actual measurement depicted in FIG. 19.

Figure 22:
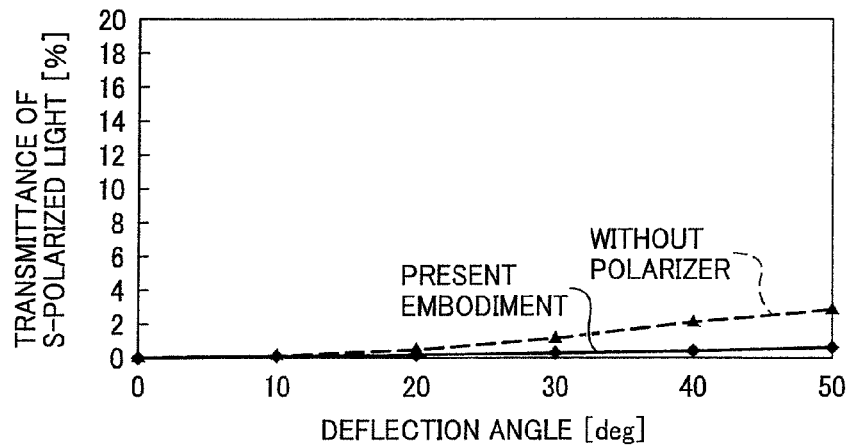
FIG. 22 is a graph for explaining a result of actual measurement of a relationship between deflection angles and transmittances of S-polarized light of the polarization splitting device according to the embodiment.

FIG. 22 is a graph of a relationship between deflection angles and transmittances of incident S-polarized light, the measurement made in a state where a polarizer whose transmittance axis is parallel to the polarization direction of the P-polarized light is arranged for light transmitted through the polarization beam splitter. The dotted line in FIG. 22 indicates the result of the actual measurement depicted in FIG. 20. Each of FIGS. 21 and 22 indicate that the addition of the polarizer favorably reduces the amount of ghost light. In particular, it is indicated that the effect on the reflectance of the P-polarized light is high.

Figure 23:
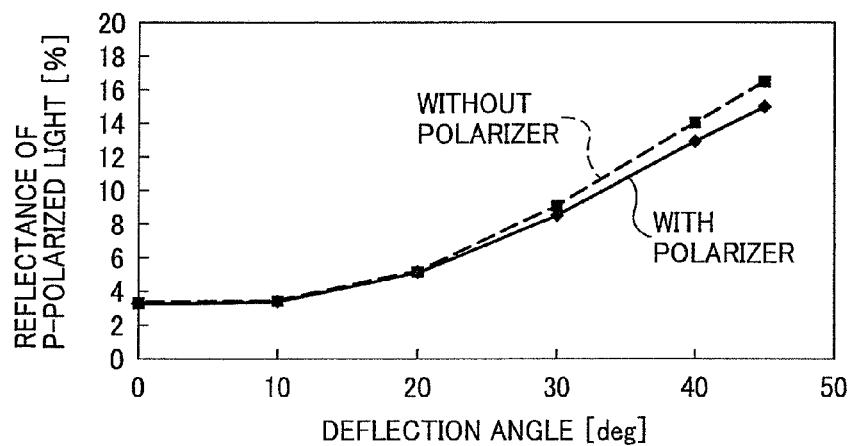
FIG. 23 is a graph for explaining a relationship between deflection angles and reflectances of P-polarized light at a polarization splitting surface is formed with dielectric multilayer.
Figure 24:
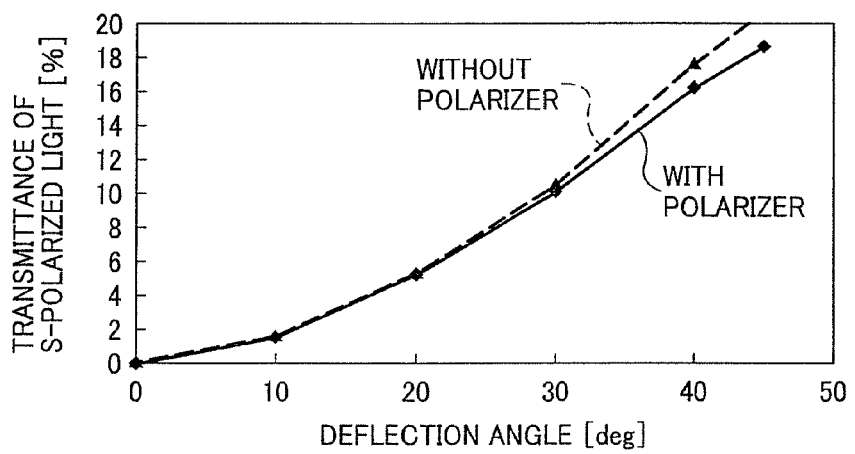
FIG. 24 is a graph for explaining a relationship between deflection angles and transmittances of S-polarized light at a polarization splitting surface is formed with dielectric multilayer.

FIGS. 23 and 24 illustrate results of evaluation performed on the dielectric-multilayer polarization splitter through similar measurements. FIG. 23 is a graph of a result of actual measurement of a relationship between deflection angles of incident P-polarized light and reflectances of the P-polarized light, the measurement made in a state where a polarization splitting surface of the dielectric-multilayer polarization splitter is tilted at 45 degrees relative to a plane of deflected light. FIG. 24 is a graph of a result of actual measurement of a relationship between deflection angles of incident S-polarized light and transmittances of the S-polarized light in the same state. The dotted line in each of FIG. 23 and FIG. 24 indicates a result of evaluation performed by using the dielectric-multilayer polarization splitter alone. The solid line in FIG. 23 indicates a relationship between the deflection angles and the reflectances of incident P-polarized light, the measurement made in a state where a polarizer whose transmittance axis is parallel to the polarization direction of the S-polarized light is arranged for light reflected from the dielectric-multilayer polarization splitter. Addition of the polarizer to the wire-grid polarization splitter produces a noticeably large effect on reduction of the amount of ghost light as compared to that produced by addition of the polarizer to the dielectric-multilayer polarization splitter, which is depicted in FIG. 21.

The solid line in FIG. 24 indicates a relationship between the deflection angles and the transmittances of incident S-polarized light, the measurement made in a state where a polarizer whose transmittance axis is parallel to the polarization direction of the P-polarized light is arranged for light transmitted through the dielectric-multilayer polarization splitter.

As is the case with the previously-mentioned reflectances of the P-polarized light incident on the polarization beam splitter, addition of the polarizer to the wire-grid polarization splitter produces a large effect on reduction of the amount of ghost light as compared to that produced by addition of the polarizer to the dielectric-multilayer polarization splitter, which is depicted in FIG. 22.

The wire-grid polarization splitter produces a larger effect on each of reduction of the amount of ghost light related to incident P-polarized light and reduction of the amount of ghost light related to incident S-polarized light than the dielectric-multilayer polarization splitter. In particular, as depicted in FIG. 21, employment of the wire-grid polarization splitter permits to reduce the amount of ghost light such that the reflectance of incident P-polarized light, which has been as high as approximately 10%, is reduced to nearly as low as 2%. This effect is considerably large for an optical scanning apparatus or an image forming apparatus that uses a polarization beam splitter.

It is also possible to interpose another optical component between the polarizer and the polarization beam splitter; however, the optical component is desirably arranged with attention so as not to change the state of polarization.

Figure 25:
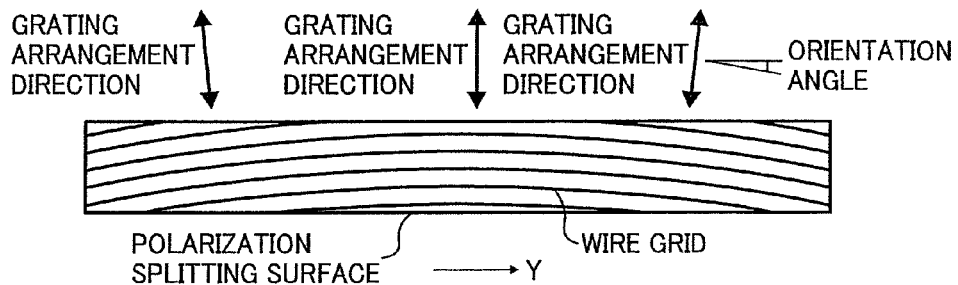
FIG. 25 is a schematic diagram for explaining a polarization beam splitter of which grating arrangement direction is nonuniform.
Figure 26:
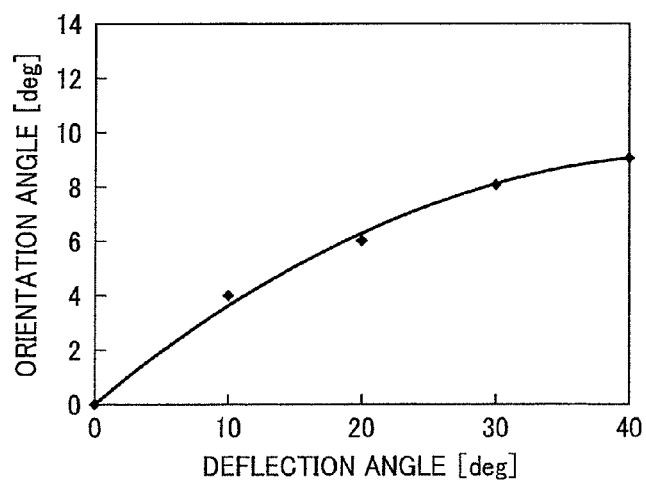
FIG. 26 is a graph for explaining a relationship between deflection angles and orientation angles of microstructure of the polarization beam splitter depicted in FIG. 25.

The wire-grid polarization splitter can further reduce the amount of ghost light by causing the direction (hereinafter, "grating arrangement direction") in which wire lines of the microstructure grating are arranged to vary depending on an incident angle. As depicted in FIG. 25, the grating arrangement direction continuously varies from one end to the other end in the longitudinal direction (in this example, the Y-axis direction) of the substrate. An angle between a direction perpendicular to the grating arrangement direction and a longitudinal direction (in this example, the Y-axis direction) of the substrate is referred to as "orientation angle" for brevity below. FIG. 26 is a graph of a relationship between orientation angles and deflection angles of the polarization beam splitter. In this example, it is set such that the larger the magnitude (absolute value) of the deflection angle, the larger the orientation angle. Accordingly, the larger an incident angle of a light beam incident on the polarization splitting surface, the larger the orientation angle on the plane (X-Y plane).

Figure 27:
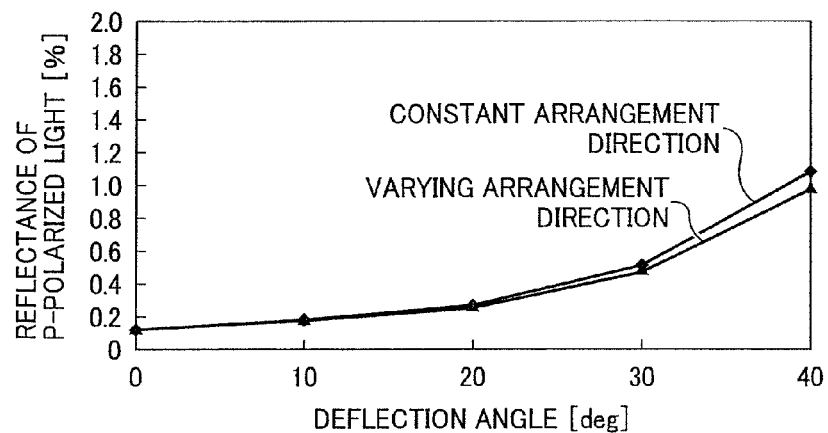
FIG. 27 is a graph for explaining a relationship between deflection angles and reflectances of P-polarized light at a polarization splitting surface of the polarization beam splitter depicted in FIG. 25.
Figure 28:
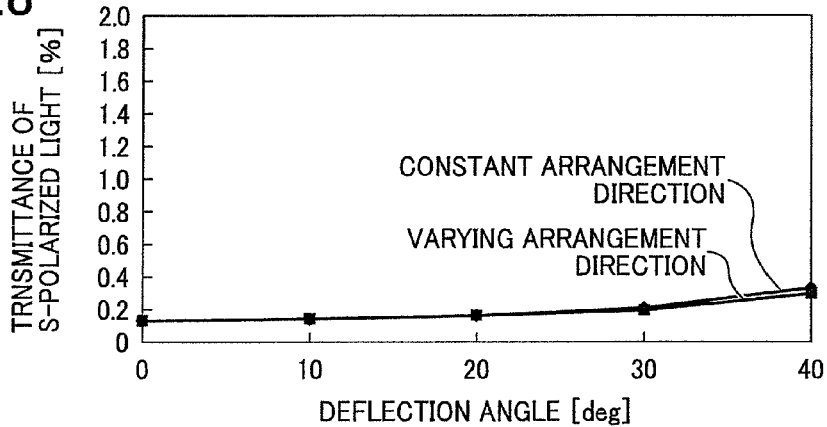
FIG. 28 is a graph for explaining a relationship between deflection angles and transmittances of S-polarized light at the polarization splitting surface of the polarization beam splitter depicted in FIG. 25.

FIG. 27 is a graph illustrating a relationship between deflection angles and reflectances of P-polarized light and FIG. 28 is a graph illustrating a relationship between deflection angles and transmittances of S-polarized light for indication of the effect, on reducing the amount of ghost light, of causing the arrangement direction to vary in addition to the conditions described with reference to FIGS. 21 and 22. As depicted in FIGS. 27 and 28, both the reflectance of the P-polarized light and the transmittance of the S-polarized light are smaller than those of the conventional configuration at positions where the deflection angle is not zero degrees.

Figure 29:
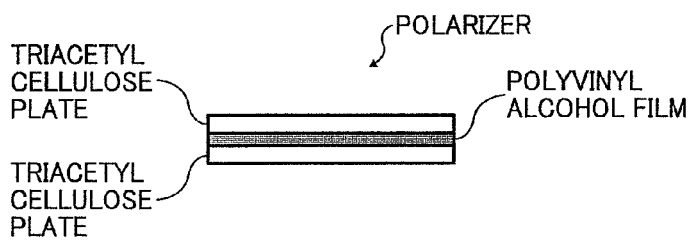
FIG. 29 is a schematic diagram for explaining the structure of a polarizer according to the embodiment.

As the polarizer for the polarization splitting device, a polarizer formed by sandwiching a polarizing film between a pair of transparent plates is preferably employed. The polarizing film is of a type that is made by doping iodine into a polarizing film made from polyvinyl alcohol (PVA) or the like and stretching the film to identically orient polymers. Examples of the materials of the transparent plate include glass and resins, such as triacetyl cellulose (see FIG. 29). A protective film for durability improvement, an anti-reflection coating layer to eliminate reflection, and/or the like can be applied to the topmost surface of the polarizing film. A polarizer that includes birefringent crystal or a wire grid polarizer can be employed; however, polarization splitting has already been substantially achieved by the polarization beam splitter arranged upstream of the polarizer. Accordingly, unless otherwise it is required to reduce the amount of ghost light considerably severely, a polarizing film is preferable because the polarizing film can provide required function and is desirable from a viewpoint of light-weight construction.

The scanning control device includes light-source control circuits (not shown) corresponding to the light sources. The light-source control circuit corresponding to the light source 10$a$ and the light source 10$b$ is mounted on the circuit board of the light source unit LU1. The light-source control circuit corresponding to the light source 10$c$ and the light source 10$d$ is mounted on the circuit board of the light source unit LU2.

As is clear from the above description, in the optical scanning device 2010 according to the present embodiment, the fθ lenses (15$_1$ and 15$_2$), the polarization splitting devices (16$_1$ and 16$_2$), the reflecting mirrors (17$_1$ and 17$_2$), the reflection mirrors (18$a$, 18$b_1$, 18$b_2$, 18$c_1$, 18$c_2$, and 18$d$), and the anamorphic lenses (19$a$, 19$b$, 19$c$, and 19$d$) form a scanning optical system.

As described above, the polarization splitting device (16$_1$, 16$_2$) according to the present embodiment includes the polarization beam splitter (16$_{11}$, 16$_{21}$) that includes the polarization splitting surface, on which the microstructure grating whose grating pitch is smaller than the wavelength of incident light is formed, allows P-polarized light to transmit therethrough, and reflects S-polarized light and the polarizer (16$_{12}$, 16$_{22}$) that is arranged on the optical path of the light beam reflected from the polarization beam splitter (16$_{11}$, 16$_{21}$) and has the transmission axis that is parallel to the polarization direction of the S-polarized light.

In this case, even when an incident angle of a light beam incident on the polarization splitting surface is large, both the reflectance of the P-polarized light and the transmittance of the S-polarized light at the polarization splitting surface can be reduced to be smaller than those of the conventional configuration. This improves performance with respect to splitting the P-polarized light and the S-polarized as compared to the conventional configuration.

Hence, a polarization splitting device capable of splitting light beams of different polarization directions excellently can be provided.

The optical scanning device 2010 according to the present embodiment includes the light source units that emit P-polarized light beams and S-polarized light beams, the polygon mirror 14 that deflects each of the light beams emitted from the light source units at substantially a constant angular velocity in the plane of deflected light, and the scanning optical system that includes the polarization splitting device (16$_1$, 16$_2$) that causes the light beams deflected by the polygon mirror 14 to be converged individually onto the surface of a corresponding one of the photosensitive drums.

Each of the polarization beam splitters is arranged such that the lager the magnitude (absolute value) of an angle of deflection by the polygon mirror 14 of a light beam incident on the polarization beam splitter at an incident position, the larger the orientation angle of the grating at the incident position.

In this case, each of the polarization splitting devices reduces both the reflectance of the P-polarized light and the transmittance of the S-polarized light at the polarization splitting surface as compared to those of a conventional polarization splitting device even for a light beam that is incident on the polygon mirror 14 at a relatively large incident angle. This leads to reduction in the amount of ghost light as compared to that of the conventional device. Accordingly, production of ghost light is stably prevented without high additional cost and upsizing.

Because the fθ lens and the polarization beam splitter are used by the two image forming stations in a sharing manner, the optical scanning device 2010 can be constructed further compact.

Because the color printer 2000 according to the present embodiment includes the optical scanning device 2010, a high-quality image can be formed with a compact construction and without high additional cost.

Figure 30A:
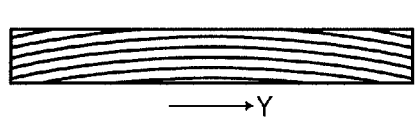
FIGS. 30A and 30B are schematic diagrams for explaining a first modification of the polarization beam splitter.
Figure 30B:
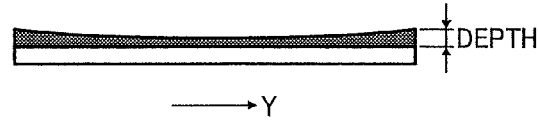
Figure 31:
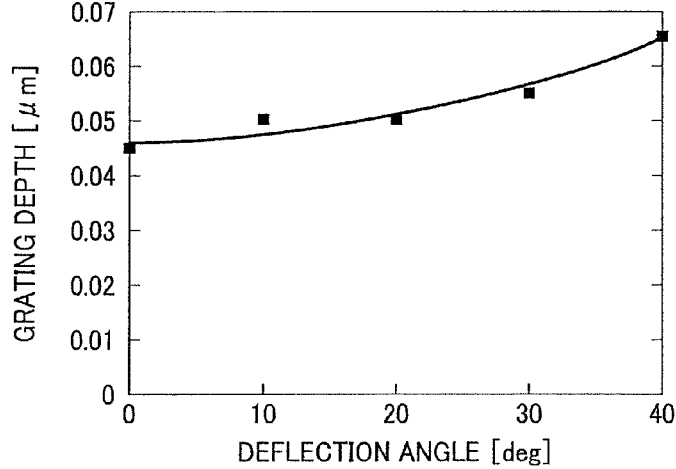
FIG. 31 is a graph for explaining a relationship between deflection angles and grating depths of microstructure of the first modification of the polarization beam splitter.

The grating depth of the polarization beam splitter of the embodiment can be, for example, as depicted in FIGS. 30A and 30B, continuously varied from the one end to the other end in the longitudinal direction of the substrate. FIG. 31 is a graph of an example of a relation between deflection angles and grating depths of the polarization beam splitter having such a configuration. The polarization beam splitter is configured such that the larger the deflection angle, the greater the grating depth.

Figure 32:
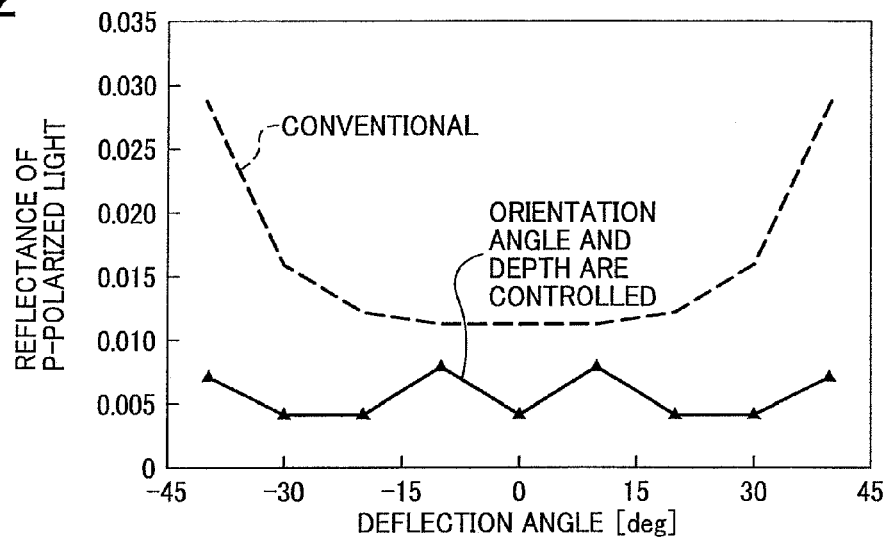
FIG. 32 is a graph for explaining a relationship between deflection angles and reflectances of P-polarized light at a polarization splitting surface of the first modification of the polarization beam splitter.
Figure 33:
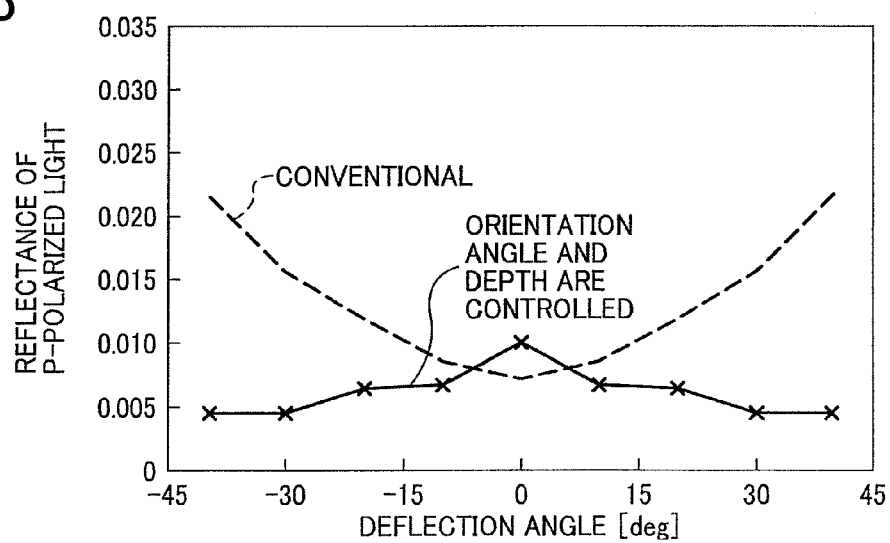
FIG. 33 is a graph for explaining a relationship between deflection angles and transmittances of S-polarized light at the polarization splitting surface of the first modification of the polarization beam splitter.

FIG. 32 is a graph of a relationship between deflection angles and reflectances of P-polarized light of the polarization beam splitter and FIG. 33 is a graph of a relationship between the deflection angles and transmittances of S-polarized light calculated in a manner similar to that described above. The amount of ghost light produced at a deflection angle of 30 degrees or larger can be further reduced as compared to that produced by the polarization beam splitter with a uniform grating depth according to the embodiment. The grating depth of the polarization beam splitter can be varied stepwise from the one end to the other end in the longitudinal direction of the substrate.

Figure 34:
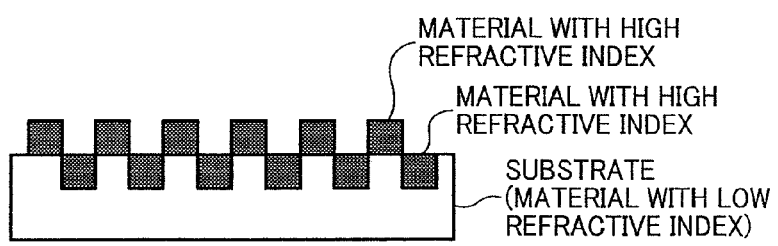
FIG. 34 is a schematic diagram for explaining a second modification the polarization beam splitter.

In the described embodiment, the microstructure of the polarization beam splitter is formed with wire grid, but not limited to such a microstructure. The microstructure of the polarization beam splitter can be a microstructure adopted by a conventional sub-wavelength structure (SWS) polarizer (see FIG. 34).

Figure 35:
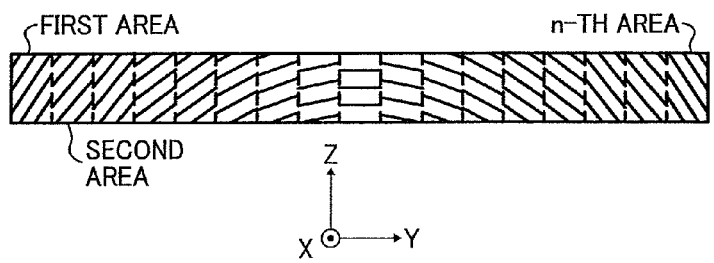
FIG. 35 is a schematic diagram for explaining a third modification the polarization beam splitter.

In the described embodiment, the grating arrangement direction of the polarization beam splitter continuously varies from the one end to the other end in the longitudinal direction of the substrate, but is not limited to such an arrangement. For example, as depicted in FIG. 35, the grating arrangement direction of the polarization beam splitter can be varied stepwise from the one end to the other end in the longitudinal direction of the substrate. In this case, the polarization splitting surface is divided into a plurality of areas (n areas in FIG. 35), in each of which each of the orientation angle, the grating pitch, the duty ratio, and the grating depth is uniform. This polarization beam splitter can be formed by sequentially transferring mold pieces (a first-area mold piece to an n-th-area mold piece) having been individually prepared for the areas into the substrate.

A method of manufacturing this polarization beam splitter will be described below briefly.

Figure 36A:
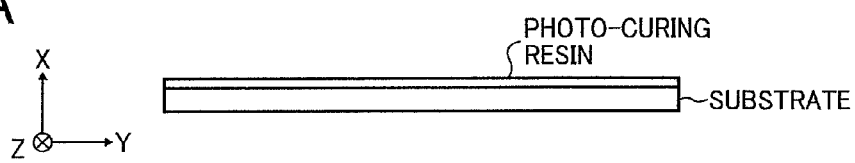
FIGS. 36A to 36E are a first set of schematic diagrams for explaining a method of manufacturing the third modification of the polarization beam splitter.

(1) Photo-curing resin coating is applied to a substrate (see FIG. 36A). The coating can be performed by a coating method, such as spin-coating, dipping, spray coating, or printing, that is appropriately selected.

Figure 36B:
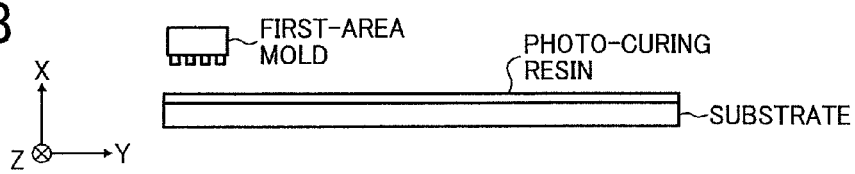

(2) After performing predetermined alignment, a mold piece for a first area (hereinafter, "first-area mold piece") is positioned above an area on the photo-curing resin corresponding to the first area (see FIG. 36B).

Figure 36C:
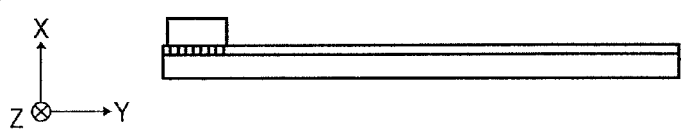

(3) The first-area mold piece is lowered and pressed against the photo-curing resin (see FIG. 36C).

Figure 36D:
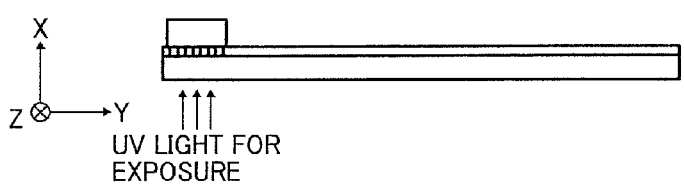

(4) The area on the photo-curing resin, against which the first-area mold piece is pressed, is irradiated with ultraviolet (UV) light and hardened (see FIG. 36D). Hence, the pattern of the first-area mold piece is transferred into the photo-curing resin at the area corresponding to the first area. Meanwhile, UV-based photo nanoimprint system is excellent in positioning accuracy because the viscosity of photo-curing resin is generally lower than the viscosity of a material of a thermosetting resist.

Figure 36E:
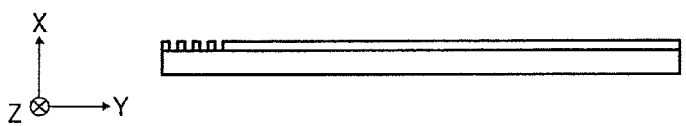

(5) The first-area mold piece is removed (see FIG. 36E).

Figure 37A:
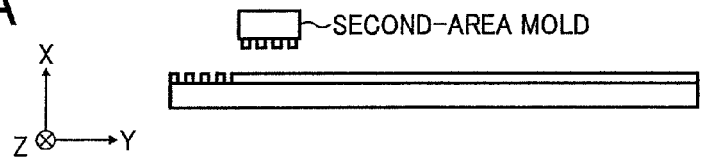
FIGS. 37A to 37E are a second set of schematic diagrams for explaining the method of manufacturing the third modification of the polarization beam splitter.

(6) After performing predetermined alignment, a mold piece for a second area (hereinafter, "second-area mold piece") is positioned at an area adjacent to the area where the first-area mold piece is transferred; that is, above an area on the photo-curing resin corresponding to the second area (see FIG. 37A).

Figure 37B:
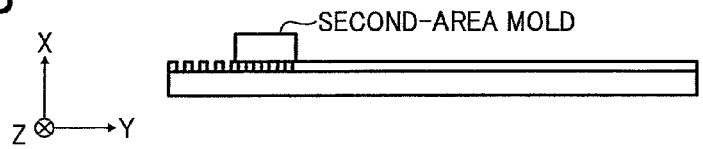

(7) The second-area mold piece is lowered and pressed against the photo-curing resin (see FIG. 37B).

(8) The area on the photo-curing resin, against which the second-area mold piece is pressed, is irradiated with UV light and hardened. Hence, the pattern of the second-area mold piece is transferred into the photo-curing resin at the area corresponding to the second area.

Figure 37C:
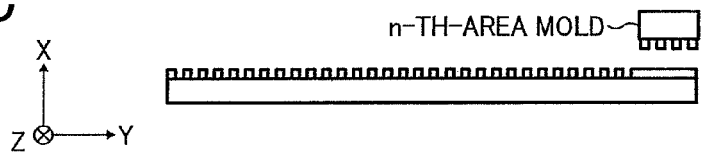
Figure 37D:
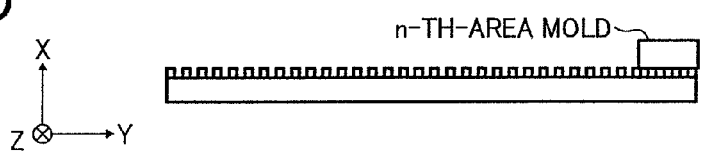

(9) The procedure is performed on all the areas in a similar manner (see FIGS. 37C and 37D).

Figure 37E:
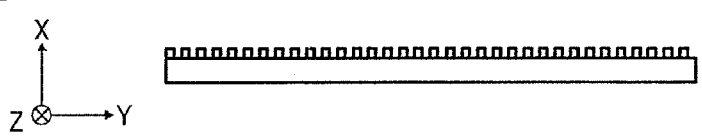

(10) A layer of aluminum, which is a material of the wire grid, is deposited on the substrate masked with the photo-curing resin, into which the patterns of all the mold pieces are transferred, which is followed by lift off. Hence, a wire grid structure is obtained (see FIG. 37E).

This manufacturing method allows to form a substantially rectilinear grating pattern with each of the mold pieces, thereby ensuring pitch accuracy in the areas and reducing pitch differences among the areas. A period of time required for manufacturing can also be reduced. Put another way, this manufacturing method allows manufacturing a polarization splitting device that is excellent in splitting light beams of different polarization directions less expensively.

In the manufacturing method, patterning of the microstructure grating is performed by directly using the mold pieces; however, patterning of the microstructure grating can be performed by temporarily forming an elongated mold for use in transfer with all the mold pieces and then performing patterning of the microstructure grating by using the elongated mold. This method is advantageous in that period of time that elapses after application of photo-curing resin coating until the patterning does not vary depending on an area, which facilitates process control.

Figure 38:
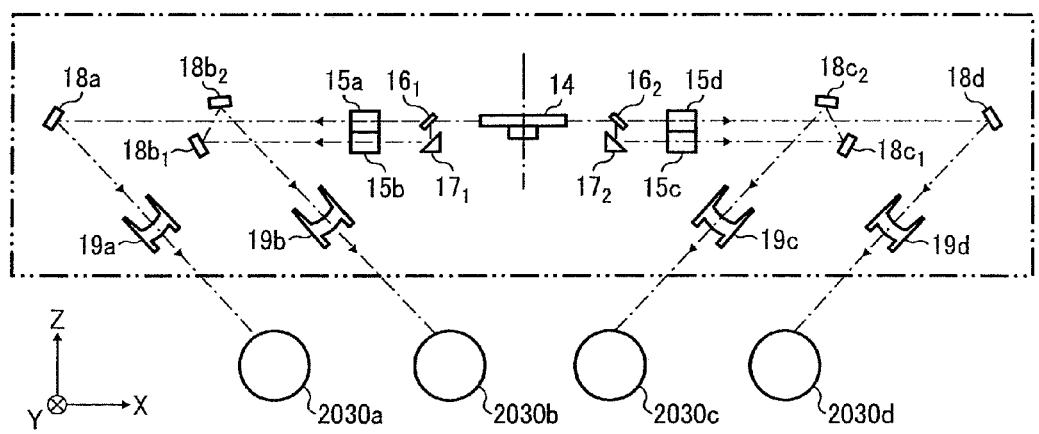
FIG. 38 is a schematic diagram for explaining a modification of an optical scanning system.

In the embodiment, for example, as depicted in FIG. 38, the polarization beam splitter can be arranged between the polygon mirror and the fθ lens. Note that this arrangement is on an assumption that there are provided an fθ lens 15a for the light beam LBa, an fθ lens 15b for the light beam LBb, an fθ lens 15c for the light beam LBc, and an fθ lens 15d for the light beam LBd. In this case, each of the fθ lenses is allowed to have a shape appropriate for the state of polarization, an optical path length, a position to be converged, and a scanning length of a corresponding one of the light beams.

The orientation angle of the grating and at least one of the grating pitch and the duty ratio of the polarization splitting ratios of the polarization beam splitter can be varied continuously or stepwise from the one end to the other end in the longitudinal direction of the substrate.

The orientation angle of the grating and at least one of refractive index and attenuation coefficient of the grating of the polarization beam splitter can be varied continuously or stepwise from the one end to the other end in the longitudinal direction of the substrate.

In the described embodiment, the deflection angle varies in a range from −40 degrees to +40 degrees, but is not limited thereto.

In the described embodiment, the image forming apparatus is the color printer 2000 that includes four photosensitive drums, but not limited thereto. For example, the image forming apparatus can be a printer that includes two photosensitive drums. In this case, a single light source unit will be employed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A polarization splitting device that splits a first light and a second light of different polarization directions, the polarization splitting device comprising:
    a polarization beam splitter configured to allow the first light beam to transmit therethrough and to reflect the second light beam, the polarization beam splitter having a polarization splitting surface on which a microstructure grating with grating pitch smaller than wavelength of incident light is formed; and
    a first polarizer arranged on an optical path of the second light beam reflected from the polarization beam splitter, the first polarizer having a transmission axis that is parallel to a polarization direction of the second light beam.

2. The polarization splitting device according to claim 1, further comprising a second polarizer arranged on an optical path of the first light beam transmitted through the polarization beam splitter, the second polarizer having a transmission axis that is parallel to a polarization direction of the first light beam.

3. The polarization splitting device according to claim 2, wherein each of the first polarizer and the second polarizer has a structure in which a polarizing film is sandwiched between a pair of transparent plates.

4. The polarization splitting device according to claim 1, wherein a grating arrangement direction of the microstructure grating at a first incident position and a grating arrangement direction of the microstructure grating at a second incident position differ from each other, the first incident position being a position where light is incident on the polarization splitting surface at an incident angle that differs from an incident angle at which light is incident on the polarization splitting surface at the second incident position.

5. The polarization splitting device according to claim 4, wherein the grating arrangement direction continuously varies from the first incident position to the second incident position.

6. The polarization splitting device according to claim 4, wherein the grating arrangement direction step-wisely varies from the first incident position to the second incident position.

7. The polarization splitting device according to claim 4, wherein
    the incident angle of the light at the first incident position is larger than the incident angle of the light at the second incident position, and
    a tilt angle of the grating arrangement direction at the first incident position relative to an imaginary line that extends through the first incident position and the second incident position is smaller than a tilt angle of the grating arrangement direction at the second incident position.

8. The polarization splitting device according to claim 7, wherein a grating depth at the first incident position is greater than a grating depth at the second incident position.

9. The polarization splitting device according to claim 4, wherein each of the first polarizer and the second polarizer has a structure in which a polarizing film is sandwiched between a pair of transparent plates.

10. The polarization splitting device according to claim 1, wherein the microstructure grating is wire grid.

11. An optical scanning device that scans a plurality of surfaces to be scanned with light beams, the optical scanning device comprising:
    a light source unit that emits a plurality of light beams including a first light beam and a second light beam of different polarization directions;
    a deflector that deflects the first light beam and the second light beam emitted from the light source unit; and
    an optical scanning system that causes the first light beam and the second light beam deflected by the deflector to be converged onto a corresponding one of the surfaces to be scanned, the optical scanning system including the polarization splitting device according to claim 1.

12. The optical scanning device according to claim 11, wherein the polarization beam splitter is arranged such that a tilt angle of a grating arrangement direction relative to a plane of deflected light at an incident position of a light beam incident on the polarization beam splitter decreases with increasing deflection angle, through which the light beam is deflected by the deflector, the plane of deflected light being a pencil-of-light-rays plane that contains trajectories of light beams deflected by the deflector at different points in time.

13. The optical scanning device according to claim 11, wherein the optical scanning system includes a scanning lens, wherein the polarization splitting device is arranged on an optical path between the deflector and the scanning lens.

14. The optical scanning device according to claim 11, wherein the optical scanning system includes a scanning lens, wherein the polarization splitting device is arranged on an optical path between the scanning lens and the surfaces to be scanned.

15. The optical scanning device according to claim 11, wherein the light source unit includes a first light source that includes the first light beam and a second light source that includes the second light beam, and
    the first light source is oriented perpendicular to the second light source.

16. An image forming apparatus comprising:
    a plurality of image carriers; and
    the optical scanning apparatus according to claim 11, the optical scanning apparatus scanning the image carriers with light beams.

* * * * *